United States Patent
Fukuzawa et al.

(10) Patent No.: US 12,490,884 B2
(45) Date of Patent: Dec. 9, 2025

(54) ENDOSCOPE

(71) Applicant: FUJIFILM Corporation, Tokyo (JP)

(72) Inventors: Tsuneo Fukuzawa, Kanagawa (JP); Yasuhiko Morimoto, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 690 days.

(21) Appl. No.: 17/179,350

(22) Filed: Feb. 18, 2021

(65) Prior Publication Data
US 2021/0169308 A1 Jun. 10, 2021

Related U.S. Application Data

(63) Continuation of application No. PCT/JP2019/033257, filed on Aug. 26, 2019.

(30) Foreign Application Priority Data

Sep. 10, 2018 (JP) ................. 2018-169149

(51) Int. Cl.
*A61B 1/00* (2006.01)
*A61B 1/018* (2006.01)
(Continued)

(52) U.S. Cl.
CPC ...... *A61B 1/00098* (2013.01); *A61B 1/00087* (2013.01); *A61B 1/018* (2013.01); *A61B 1/0625* (2022.02); *A61B 8/12* (2013.01)

(58) Field of Classification Search
CPC ... A61B 1/00096; A61B 1/00098; A61B 1/06; A61B 1/00179; A61B 1/05;
(Continued)

(56) References Cited

U.S. PATENT DOCUMENTS

| 7,771,349 B2 * | 8/2010 | Kohno | ..................... A61B 8/12 |
| | | | 600/106 |
| 7,946,993 B2 * | 5/2011 | Kohno | .................. A61B 1/018 |
| | | | 600/164 |

(Continued)

FOREIGN PATENT DOCUMENTS

| JP | S58168711 | 11/1983 |
| JP | H08126604 | 5/1996 |

(Continued)

OTHER PUBLICATIONS

"International Search Report (Form PCT/ISA/210) of PCT/JP2019/033257," mailed on Nov. 5, 2019, with English translation thereof, pp. 1-5.

(Continued)

*Primary Examiner* — Michael J Carey
*Assistant Examiner* — Timothy Tuan Luu
(74) *Attorney, Agent, or Firm* — JCIPRNET

(57) ABSTRACT

The endoscope includes a treatment tool delivery port that is formed in a distal end part body and allows a treatment tool to be delivered therethrough; an elevator that controls a delivery direction of the treatment tool delivered from the treatment tool delivery port; an observation window that is provided at a position closer to a first direction side in a latitudinal direction than the treatment tool delivery port in the distal end part body in a case where a direction perpendicular to both a longitudinal axis and a normal direction of an opening surface of the treatment tool delivery port is the latitudinal direction of the treatment tool delivery port; and a first illumination window that is provided at a position closer to a second direction side opposite to the first direction side than the treatment tool delivery port in the distal end part body.

19 Claims, 15 Drawing Sheets

(51) Int. Cl.
*A61B 1/06* (2006.01)
*A61B 8/12* (2006.01)

(58) Field of Classification Search
CPC . A61B 1/0623; A61B 1/00181; A61B 1/0627; A61B 1/0625; A61B 1/062
USPC .......................................................... 600/177
See application file for complete search history.

(56) References Cited

U.S. PATENT DOCUMENTS

| 2007/0135682 | A1 | 6/2007 | Miyagi et al. | |
|---|---|---|---|---|
| 2007/0232922 | A1 | 10/2007 | Kohno | |
| 2010/0324373 | A1* | 12/2010 | Lei | A61B 1/00096 600/176 |
| 2014/0330078 | A1* | 11/2014 | Hwang | A61B 1/00194 600/109 |

FOREIGN PATENT DOCUMENTS

| JP | H08126643 | | 5/1996 | |
|---|---|---|---|---|
| JP | 08248329 | A * | 9/1996 | |
| JP | 2005261746 | | 9/2005 | |
| JP | 2005287526 | | 10/2005 | |
| JP | 2005287593 | | 10/2005 | |
| JP | 2007252457 | | 10/2007 | |
| JP | 2007252458 | A * | 10/2007 | ......... A61B 1/00082 |
| JP | 2018134276 | | 8/2018 | |
| WO | 2006011488 | | 2/2006 | |
| WO | 2018029103 | | 2/2018 | |

OTHER PUBLICATIONS

"Written Opinion of the International Searching Authority (Form PCT/ISA/237) of PCT/JP2019/033257," mailed on Nov. 5, 2019, with English translation thereof, pp. 1-7.

* cited by examiner

ENDOSCOPE

CROSS-REFERENCE TO RELATED APPLICATIONS

The present application is a Continuation of PCT International Application No. PCT/JP2019/033257 filed on Aug. 26, 2019 claiming priority under 35 U.S.C § 119(a) to Japanese Patent Application No. 2018-169149 filed on Sep. 10, 2018. Each of the above applications is hereby expressly incorporated by reference, in its entirety, into the present application.

BACKGROUND OF THE INVENTION

1. Field of the Invention

The present invention relates to an endoscope including a treatment tool delivery port and an elevator on a distal end side of an insertion part.

2. Description of the Related Art

As an ultrasound endoscope, there is known one in which an electronic scanning type ultrasound transducer is provided at a distal end part of an insertion part of the endoscope and a treatment tool delivery port is disposed on a proximal end side of the ultrasound transducer in the distal end part. In endoscopy using this ultrasound endoscope, for example, while acquiring an ultrasound image of a treatment target region (including an observed region, an examined region, and the like) with the ultrasound transducer, cells are collected by puncturing a treatment target region with a puncturing treatment tool delivered into the body through a treatment tool insertion channel and a treatment tool delivery port. Also, in order to treat a desired position with such a treatment tool, it is necessary to change the delivery direction of the treatment tool delivered from the treatment tool delivery port formed at the distal end part of the insertion part. For this reason, a treatment tool elevating mechanism is provided inside the treatment tool delivery port of the distal end part of the insertion part (refer to JP2005-287593A, JP2005-261746A, JP2005-287526A, JP1996-126643A (JP-H08-126643A), and JP1996-126604A (JP-H08-126604A)).

The treatment tool elevating mechanism includes an elevator housing chamber, an elevator, an elevator rotating mechanism, and the like. The elevator housing chamber is provided in the treatment tool delivery port of the distal end part of the insertion part. The elevator is supported in the elevator housing chamber so as to be rotatable about a rotation shaft. The elevator rotating mechanism rotates the elevator depending on the rotational operation of the elevator, which is performed by the operating part of the ultrasound endoscope.

In addition to the treatment tool delivery port and an observation window for observing the treatment target region, an illumination window for emitting illumination light toward the treatment target region and the like is provided on an outer surface of the distal end part of the insertion part. Additionally, a light guide (optical fiber cable) that guides the illumination light from the light source device to the illumination window is inserted into the insertion part.

In the ultrasound endoscopes described in JP2005-287593A, JP2005-261746A, and JP2005-287526A, the illumination window is provided at a position closer to the distal end side of the distal end part than the treatment tool delivery port on the outer surface of the distal end part of the insertion part. Additionally, in ultrasound endoscopes described in JP1996-126643A (JP-H08-126643A), and JP1996-126604A (JP-H08-126604A)), in a case where a direction parallel to the rotation shaft of the elevator is the width direction of the treatment tool delivery port, the illumination window is provided at a position on one direction side in the width direction with respect to the treatment tool delivery port on the outer surface of the distal end part of the insertion part.

In an endoscope described in JP1983-168711U (JP-S58-168711U), the illumination window is provided at a position closer to the insertion direction side (distal end side) than the observation window on the outer surface of the distal end part of the insertion part. Additionally, in an ultrasound endoscope described in JP2007-252457A, two illumination windows are provided at a position closer to the proximal end side of the distal end part than the treatment tool delivery port on the outer surface of the distal end part of the insertion part.

SUMMARY OF THE INVENTION

At the distal end part of the insertion part of each ultrasound endoscope described in to JP2005-287593A, JP2005-261746A, and JP2005-287526A, the illumination window is disposed at a position closer to the distal end side of the distal end part than the treatment tool delivery port. Therefore, there is a concern that the illumination light does not hit a treatment tool delivered from the treatment tool delivery port and a treatment target region thereof. Additionally, since the way the illumination light hits the treatment tool changes due to the displacement of the treatment tool accompanying the rotation of the elevator, there is a concern that the endoscope image is not easily seen and the treatment tool and the treatment target region may be out of the illumination range of the illumination light.

At the distal end part of the insertion part of each ultrasound endoscope described in JP1996-126643A (JP-H08-126643A) and JP1996-126604A (JP-H08-126604A), the illumination window is disposed at a position on the one direction side in the already-described width direction with respect to the treatment tool delivery port. Therefore, as compared to the ultrasound endoscopes described in JP2005-287593A, JP2005-261746A, and JP2005-287526A, there is a higher possibility that the treatment tool and the treatment target region thereof will fall within the illumination range of the illumination light. However, in the ultrasound endoscopes described in JP1996-126643A (JP-H08-126643A) and JP1996-126604A (JP-H08-126604A), there are concerns that the light amount of illumination light emitted from the illumination window toward the insertion direction side of the insertion part decreases and the visibility (forward visibility) of the inner wall of the lumen on the insertion direction side decreases.

Additionally, in the ultrasound endoscopes described in JP1996-126643A (JP-H08-126643A) and JP1996-126604A (JP-H08-126604A), in a case where the inner wall surface of, for example, a narrow lumen such as the duodenum is illuminated, there is a concern that the distance between the illumination window and the inner wall surface of the lumen is too close and the light amount of illumination light emitted from the illumination window to the inner wall surface of the lumen becomes excessive. In this case, halation occurs in an endoscope image.

JP1983-168711U (JP-S58-168711U) does not describe that the treatment tool and the treatment target region are illuminated with the illumination light emitted from the illumination window.

At the distal end part of the insertion part of the ultrasound endoscope described in JP2007-252457A, the illumination window is disposed at a position closer to the proximal end side of the distal end part than the treatment tool delivery port. Therefore, as compared to the ultrasound endoscopes described in JP2005-287593A, JP2005-261746A, JP2005-287526A, JP1996-126643A (JP-H08-126643A), and JP1996-126604A (JP-H08-126604A), there is a higher possibility that the treatment tool and the treatment target region thereof will fall within the illumination range of the illumination light. However, also in the ultrasound endoscope described in JP2007-252457A, there is a concern that the light amount of the illumination light emitted from the illumination window toward the insertion direction side of the insertion part decreases and the already-described forward visibility decreases.

Additionally, the illumination axis of the illumination window described in each of the above patent documents is inclined with respect to a reference axis parallel to the longitudinal axis of the distal end part of the insertion part. For this reason, as the inclination angle of the illumination axis of the illumination window increases, the inclination angle of the distal end part of the light guide (light guide distal end part) disposed at the distal end part with respect to the reference axis needs to be increased (refer to FIG. 16 described below). In this case, unless the diameter of the distal end part of the insertion part is increased, the space for disposing the light guide distal end part in the distal end part cannot be ensured.

The present invention has been made in view of such circumstances, and an object thereof is to provide an endoscope that can appropriately illuminate an insertion direction side of an insertion part, a treatment tool and a treatment target region thereof and can reduce the diameter of a distal end part of the insertion part.

An endoscope for achieving the object of the present invention, comprises a distal end part body that is provided on a distal end side of an insertion part and has a distal end, a proximal end, and a longitudinal axis; a treatment tool delivery port that is formed in the distal end part body and delivers a treatment tool inserted into the insertion part; an elevator that is rotatably supported in the treatment tool delivery port of the distal end part body and controls a delivery direction of the treatment tool delivered from the treatment tool delivery port; and an observation window that is provided at a position closer to one direction side in a width direction than the treatment tool delivery port in the distal end part body in a case where a direction perpendicular to both the longitudinal axis and a normal direction of an opening surface of the treatment tool delivery port is the width direction of the treatment tool delivery port; and a first illumination window that is provided at a position closer to the other direction side opposite to the one direction side than the treatment tool delivery port in the distal end part body. A first illumination axis angle is smaller than an observation axis angle in a case where an inclination angle of an observation axis of the observation window with respect to a reference axis parallel to the longitudinal axis as seen from the width direction side is the first illumination axis angle and an inclination angle of a first illumination axis of the first illumination window with respect to the reference axis as seen from the width direction side is the first illumination axis angle.

According to this endoscope, it is possible to increase the illumination light amount with which the insertion direction side of the insertion part is illuminated and reduce the illumination light amount of the illumination light emitted to an inner wall surface of a lumen. Additionally, the inclination angle of the light guide distal end part of the light guide corresponding to the first illumination window can be reduced.

In the endoscope according to another aspect of the present invention, both the observation axis and the first illumination axis are inclined toward a distal end side of the distal end part body from a posture perpendicular to both the width direction and the longitudinal axis.

In the endoscope according to still another aspect of the present invention, the distal end part body has a first inclined surface having the observation axis as a normal line and having the observation window provided thereon, and a second inclined surface having the first illumination axis as a normal line and having the first illumination window provided thereon.

In the endoscope according to still another aspect of the present invention, a first illumination range of illumination light emitted from the first illumination window includes an observation range of the observation window. Accordingly, the visibility of the observation range of the observation window can be improved.

In the endoscope according to still another aspect of the present invention, the observation window and the first illumination window are provided at a position closer to a proximal end side of the distal end part body than the treatment tool delivery port in the distal end part body. Accordingly, it is possible to reliably illuminate the treatment tool and the treatment target region thereof with the illumination light from the first illumination window and observe the treatment tool and the treatment target region thereof through the observation window, regardless of the rotational position of the elevator.

The endoscope according to still another aspect of the present invention further comprises a second illumination window that is provided at a position closer to the one direction side than the treatment tool delivery port in the distal end part body. A second illumination axis of the second illumination window is inclined toward a distal end side of the distal end part body from a posture perpendicular to both the width direction and the longitudinal axis, and a second illumination axis angle is equal to the observation axis angle in a case where an inclination angle of the second illumination axis with respect to the reference axis as seen from the width direction side is the second illumination axis angle. Accordingly, it is possible to reliably illuminate the treatment tool and the treatment target region thereof with the illumination light from the second illumination window.

In the endoscope according to still another aspect of the present invention, the second illumination window is provided at a position closer to a proximal end side of the distal end part body than the treatment tool delivery port in the distal end part body. Accordingly, it is possible to reliably illuminate the treatment tool and the treatment target region thereof with the illumination light from the second illumination window.

In the endoscope according to still another aspect of the present invention, the distal end part body has a first inclined surface having the observation axis as a normal line and having the observation window provided thereon, and the second illumination window is provided on the first inclined surface.

In the endoscope according to still another aspect of the present invention, a second illumination range of illumination light emitted from the second illumination window includes an observation range of the observation window. Accordingly, the visibility of the observation range of the observation window can be improved.

In the endoscope according to still another aspect of the present invention, an elevator support member that rotatably supports the elevator is provided at a position of the elevator on the other direction side inside the distal end part body, a light guide that emits illumination light through the first illumination window is inserted into the insertion part, and the elevator support member holds a light guide distal end part of the light guide on a first illumination window side. Since the inclination angle of the light guide distal end part of the light guide corresponding to the first illumination window can be reduced, the distal end part of the insertion part can be made smaller in diameter.

The endoscope according to still another aspect of the present invention further comprises an ultrasound transducer that is provided in the distal end part body and is located closer to a distal end side of the distal end part body than the treatment tool delivery port.

The present invention can appropriately illuminate the insertion direction side of the insertion part, the treatment tool and the treatment target region thereof and can reduce the diameter of the distal end part of the insertion part.

DESCRIPTION OF THE PREFERRED EMBODIMENTS

[Configuration of Ultrasound Examination System and Ultrasound Endoscope]

Figure 1:
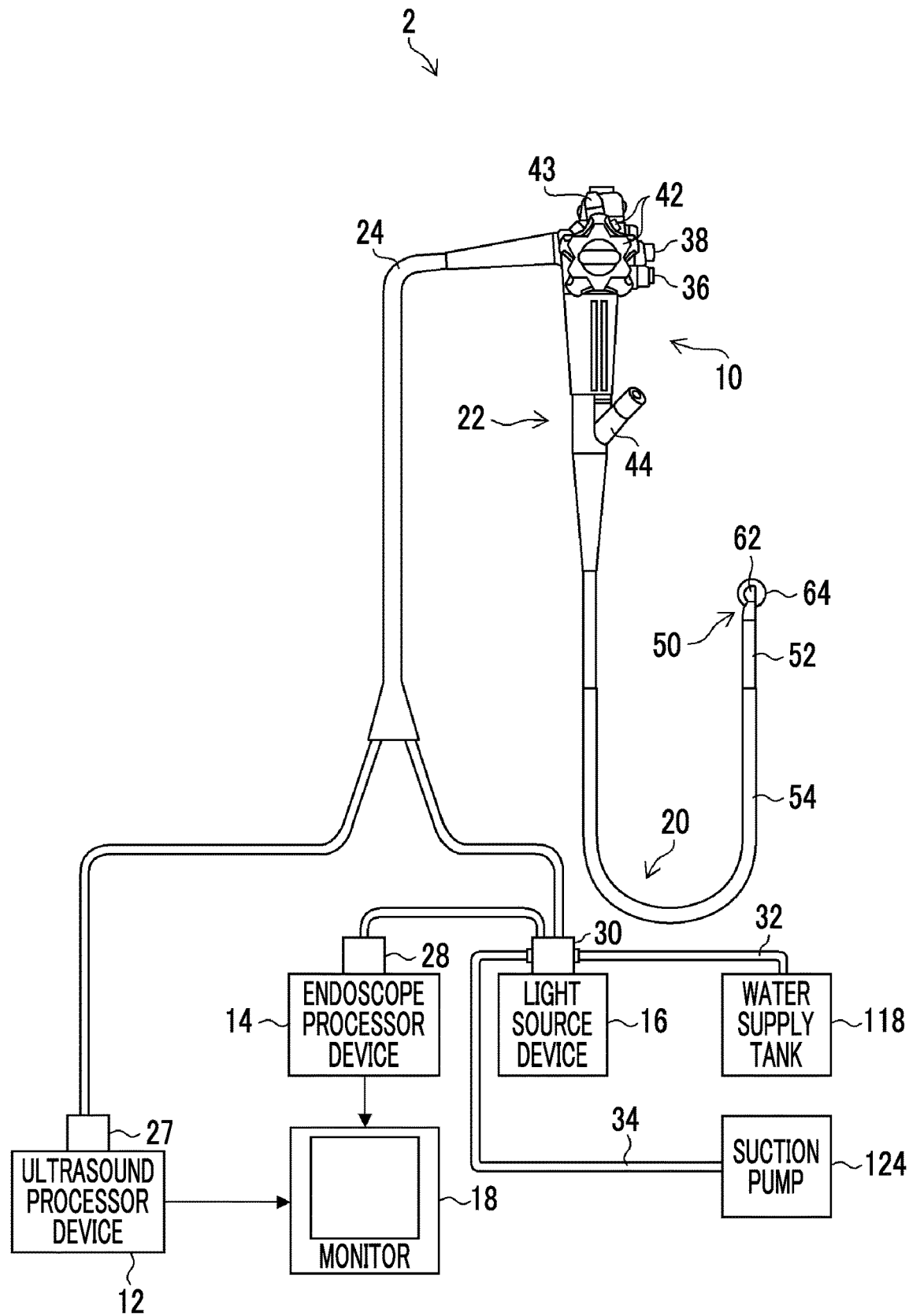
FIG. 1 is a schematic view of an ultrasound examination system to which an endoscope of the present invention is applied.

FIG. 1 is a schematic view of an ultrasound examination system 2 to which an endoscope of the present invention is applied. As illustrated in FIG. 1, the ultrasound examination system 2 includes an ultrasound endoscope 10 that images the inside of a lumen 154 (also referred to as a body cavity, refer to FIG. 15) of a subject, an ultrasound processor device 12 that generates an ultrasound image, an endoscope processor device 14 that generates an endoscope image, a light source device 16 that supplies illumination light for illuminating the inside of the lumen 154 to the ultrasound endoscope 10, and a monitor 18 for displaying the ultrasound image and the endoscope image.

The ultrasound endoscope 10 corresponds to the endoscope of the present invention and includes an insertion part 20, an operating part 22, and a universal cord 24.

Figure 15:
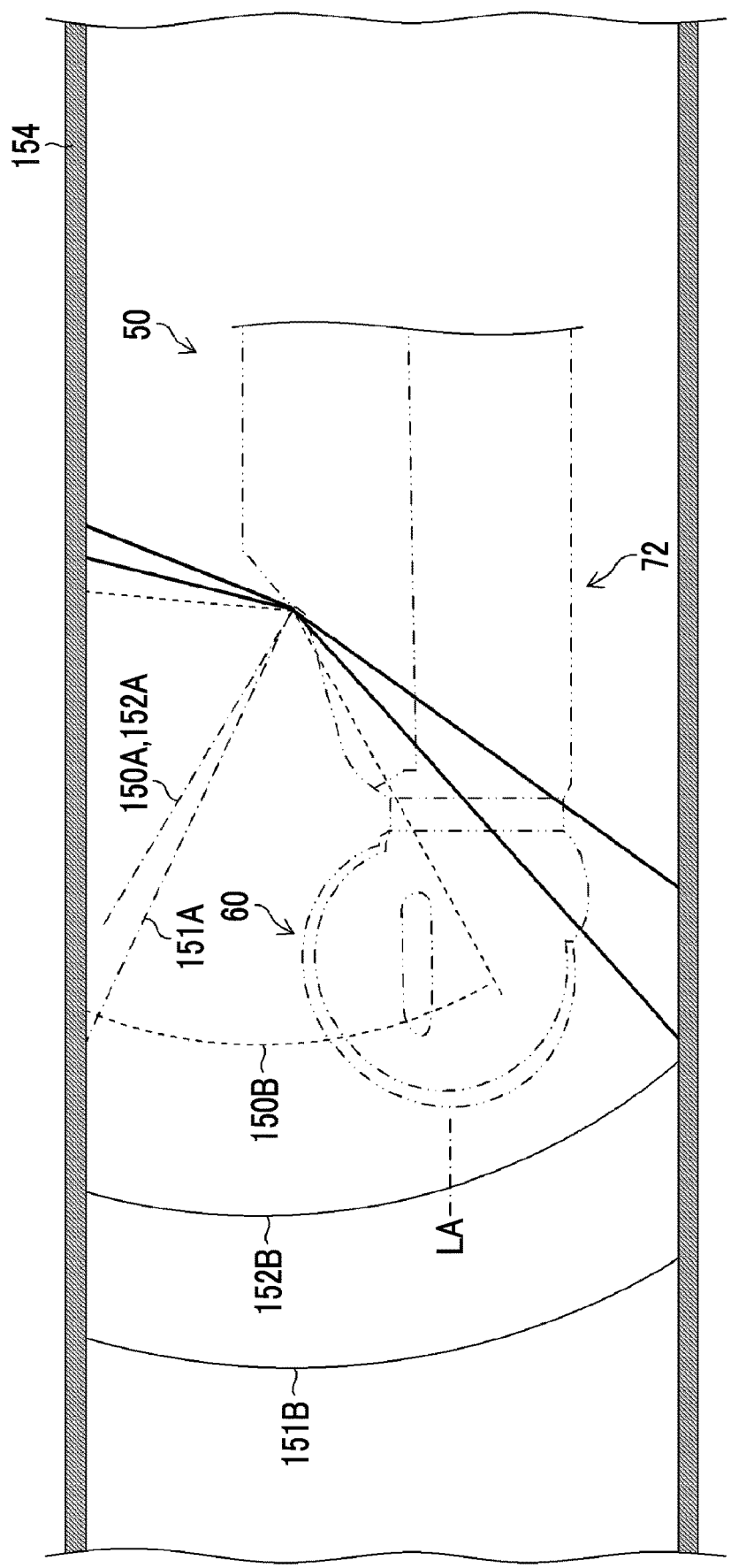
FIG. 15 is a side view of the distal end part of the insertion part inserted into a lumen.

The insertion part 20 is inserted into various lumens 154 (refer to FIG. 15). The operating part 22 is continuously provided on a proximal end side of the insertion part 20 and receives an operation of a surgeon.

The operating part 22 is connected to one end side of the universal cord 24. Additionally, an ultrasound connector 27 connected to the ultrasound processor device 12, an endoscope connector 28 connected to the endoscope processor device 14, and a light source connector 30 connected to the light source device 16 are provided on the other end side of the universal cord 24. A water supply tank 118 is connected to the light source connector 30 via an air and water supply tube 32, and a suction pump 124 is connected to the light source connector 30 via a suction tube 34.

The ultrasound processor device 12 generates an ultrasound image on the basis of an ultrasound detection signal output from the ultrasound endoscope 10. Additionally, the endoscope processor device 14 also generates an endoscope image on the basis of an imaging signal output from the ultrasound endoscope 10.

The light source device 16 is connected to the insertion part 20, the operating part 22, the universal cord 24, and an incident end of a light guide 128 (refer to FIG. 2) inserted into the light source connector 30. The light source device 16 supplies illumination light to the incident end of the light guide 128. The illumination light is emitted from the light guide 128 to treatment target regions through respective illumination windows 90A and 90B (refer to FIG. 3) described below.

The monitor 18 is connected to both the ultrasound processor device 12 and the endoscope processor device 14 and displays an ultrasound image generated by the ultrasound processor device 12 and endoscope image generated by the endoscope processor device 14. With regard to the display of the ultrasound image and the endoscope image, only any one of the images can be selectively displayed or both of the images can be simultaneously displayed.

An air and water supply button 36 and a suction button 38 and are provided side by side on the operating part 22, which is provided with a pair of angle knobs 42, an operating lever 43, a treatment tool insertion port 44, and the like.

The insertion part 20 has a distal end, a proximal end, and a longitudinal axis and has a distal end part 50, a bending part 52, and a flexible part 54 in order toward the proximal end side from the distal end side. The distal end part 50 is formed of a hard member and is also referred to as a distal end hard part. An ultrasound transducer 62 is provided on the distal end part 50 on which a balloon 64 that covers the ultrasound transducer 62 is attachably and detachably mounted.

The bending part 52 has one end continuously provided on the proximal end side of the distal end part 50 and the other end continuously provided on the distal end side of the flexible part 54. The bending part 52 is configured to be bendable and is operated to be remotely bent by performing the rotational movement operation of the pair of angle knobs 42. Accordingly, the distal end part 50 can be oriented in a desired direction.

The flexible part 54 has a small diameter, a long length, and flexibility and couples the bending part 52 to the operating part 22.

Figure 2:
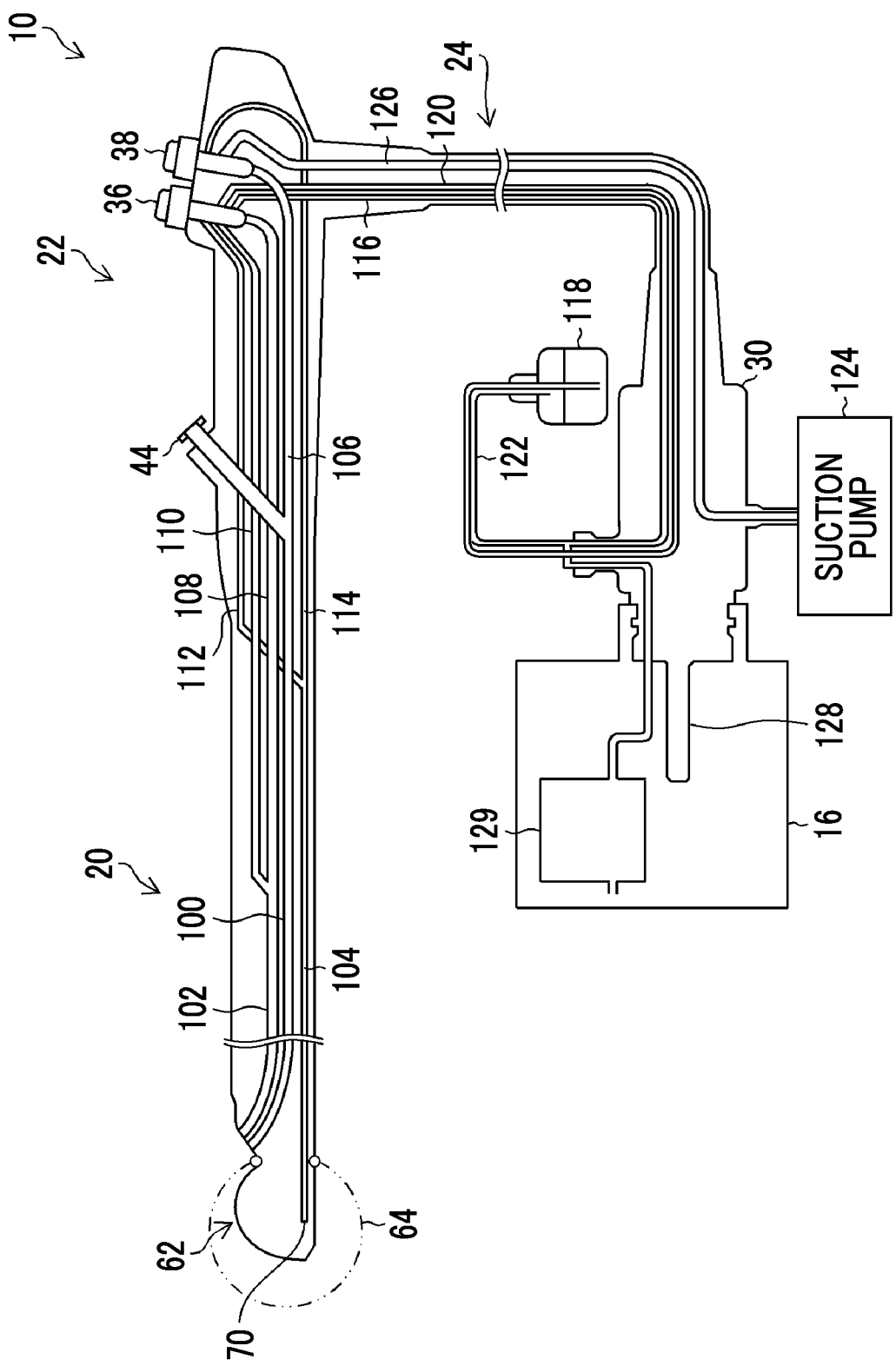
FIG. 2 is a schematic view illustrating a pipe line configuration of an ultrasound endoscope.

FIG. 2 is a schematic view illustrating various pipe lines of the ultrasound endoscope 10. As illustrated in FIG. 2, a treatment tool insertion channel 100, an air and water supply pipe line 102, and a balloon pipe line 104 having one end leading to an internal space of the balloon 64 are provided inside the insertion part 20 and the operating part 22.

One end side of the treatment tool insertion channel 100 is connected to an elevating case 200 (refer to FIG. 5) described below, and the other end side of the treatment tool insertion channel 100 is connected to the treatment tool insertion port 44 in the operating part 22. Accordingly, the treatment tool insertion port 44 and the treatment tool delivery port 94 (refer to FIG. 3) described below communicate with each other via the treatment tool insertion channel 100. Additionally, a suction pipe line 106 is branched from the treatment tool insertion channel 100, and the suction pipe line 106 is connected to the suction button 38.

One end side of the air and water supply pipe line 102 is connected to an air and water supply nozzle 92 (refer to FIG. 3) described below, and the other end side of the air and water supply pipe line 102 is branched into an air supply pipe line 108 and a water supply pipe line 110. The air supply pipe line 108 and the water supply pipe line 110 are connected to the air and water supply button 36, respectively.

One end side of the balloon pipe line 104 is connected to a supply and discharge port 70 that opens at a position inside the balloon 64 in an outer peripheral surface of the distal end part 50, and the other end side of the balloon pipe line 104 is branched to a balloon water supply pipe line 112 and a balloon drainage pipe line 114. The balloon water supply pipe line 112 is connected to the air and water supply button 36, and the balloon drainage pipe line 114 is connected to the suction button 38.

In addition to the air supply pipe line 108, the water supply pipe line 110, and the balloon water supply pipe line 112, one end side of an air supply source pipe line 116 leading to an air supply pump 129 and one end side of a water supply source pipe line 120 leading to the water supply tank 118 are connected to the air and water supply button 36. The air supply pump 129 always operates during ultrasound observation.

A branch pipe line 122 is branched from the air supply source pipe line 116, and the branch pipe line 122 is connected to an inlet (above a liquid surface) of the water supply tank 118. Additionally, the other end side of the water supply source pipe line 120 is inserted into the water supply tank 118 (below the liquid surface). Then, in a case where the internal pressure of the water supply tank 118 rises due to the air supply from the air supply pump 129 via the branch pipe line 122, the water in the water supply tank 118 is supplied to the water supply source pipe line 120.

As the air and water supply button 36, a publicly known two-stage switchable button is used. The air and water supply button 36 switches between the leak of air sent from the air supply source pipe line 116, the jetting of air from the air and water supply nozzle 92, the jetting of water supply from the air and water supply nozzle 92, and the supply of water into the balloon 64, depending on the surgeon's operation. In addition, since a specific switching method is a known technique, the description thereof will be omitted here.

In addition to the suction pipe line 106 and the balloon drainage pipe line 114, one end side of a suction source pipe line 126 is connected to the suction button 38. A suction pump 124 is connected to the other end side of the suction source pipe line 126. The suction pump 124 also always operates during the ultrasound observation. The suction button 38 is a two-stage switchable button similar to the air and water supply button 36.

The suction button 38 switches between the communication of the suction source pipe line 126 with the outside (atmosphere), the suction of various suctioned materials from the treatment tool delivery port 94 (refer to FIG. 3), and the drainage of water in the balloon 64, depending on the surgeon's operation. In addition, since a specific switching method is a known technique, the description thereof will be omitted here.

Returning to FIG. 1, although the operating lever 43 of the operating part 22 is described in detail below, the operating lever 43 is used for the operation of changing the delivery direction of a treatment tool (not illustrated, the same applies below) delivered from the treatment tool delivery port 94 (refer to FIG. 3).

[Configuration of Distal End Part of Insertion Part]

Figure 3:
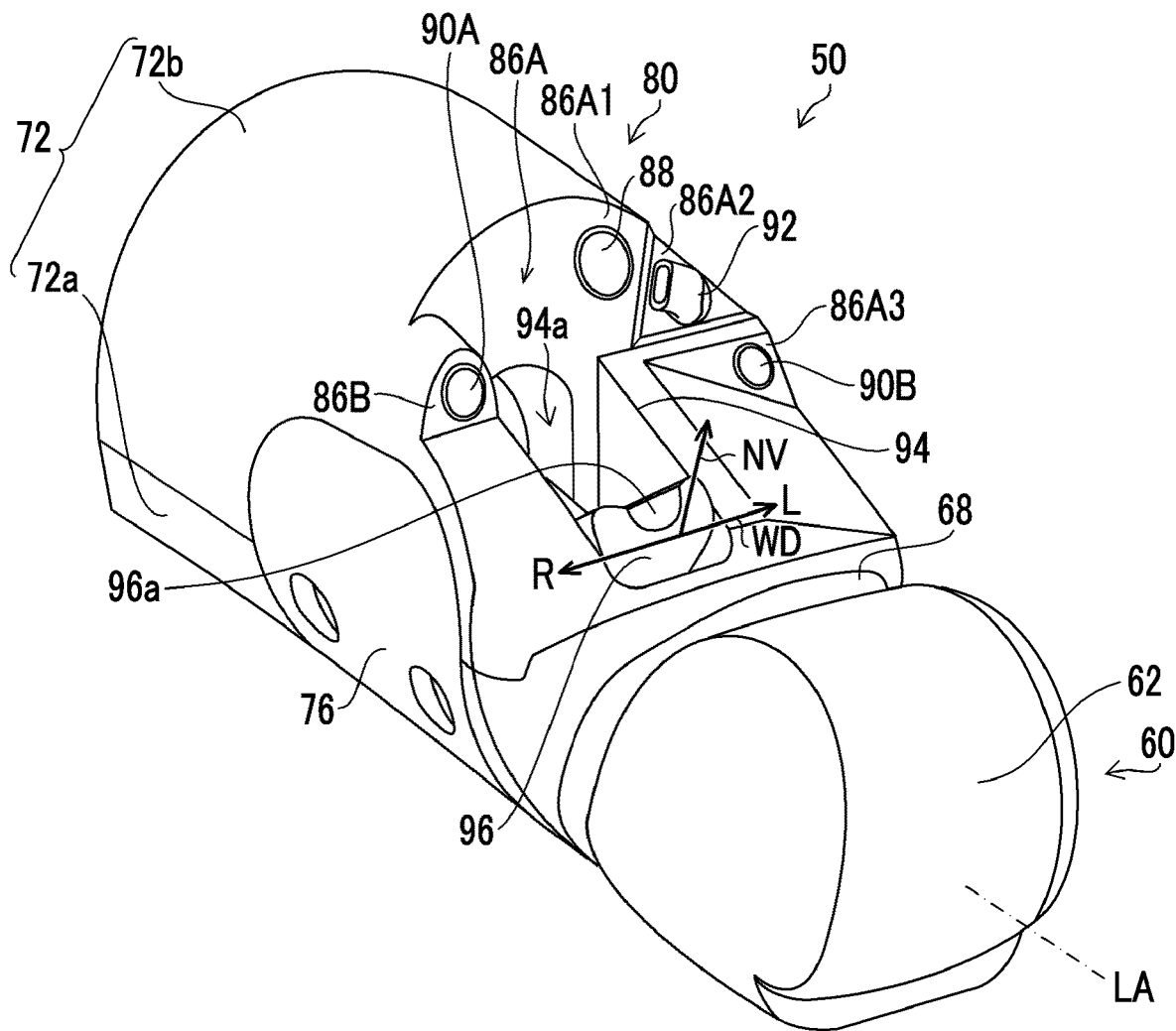
FIG. 3 is an external perspective view of a distal end part of an insertion part.
Figure 4:
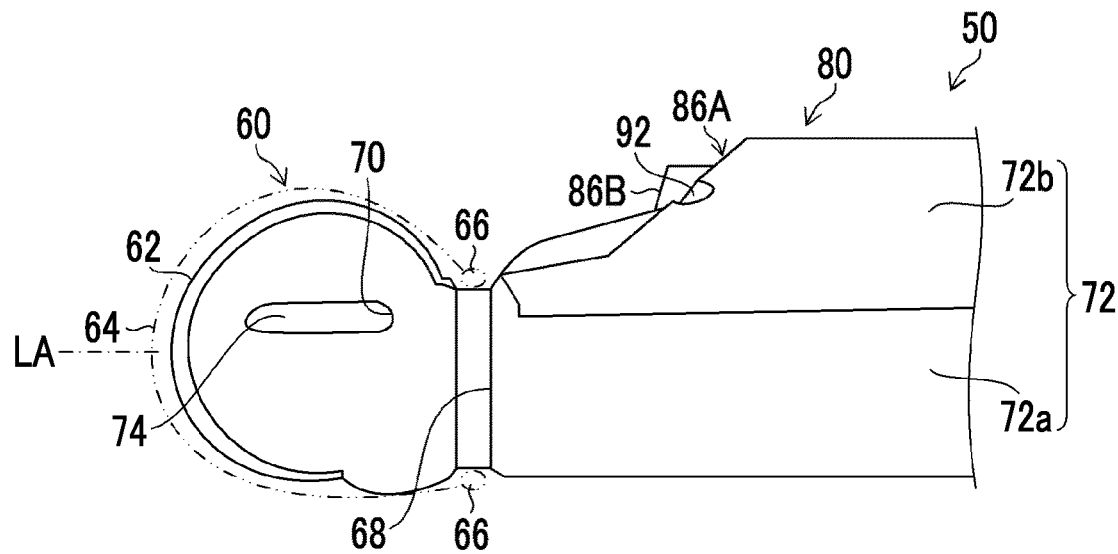
FIG. 4 is a right side view of the insertion part.
Figure 5:
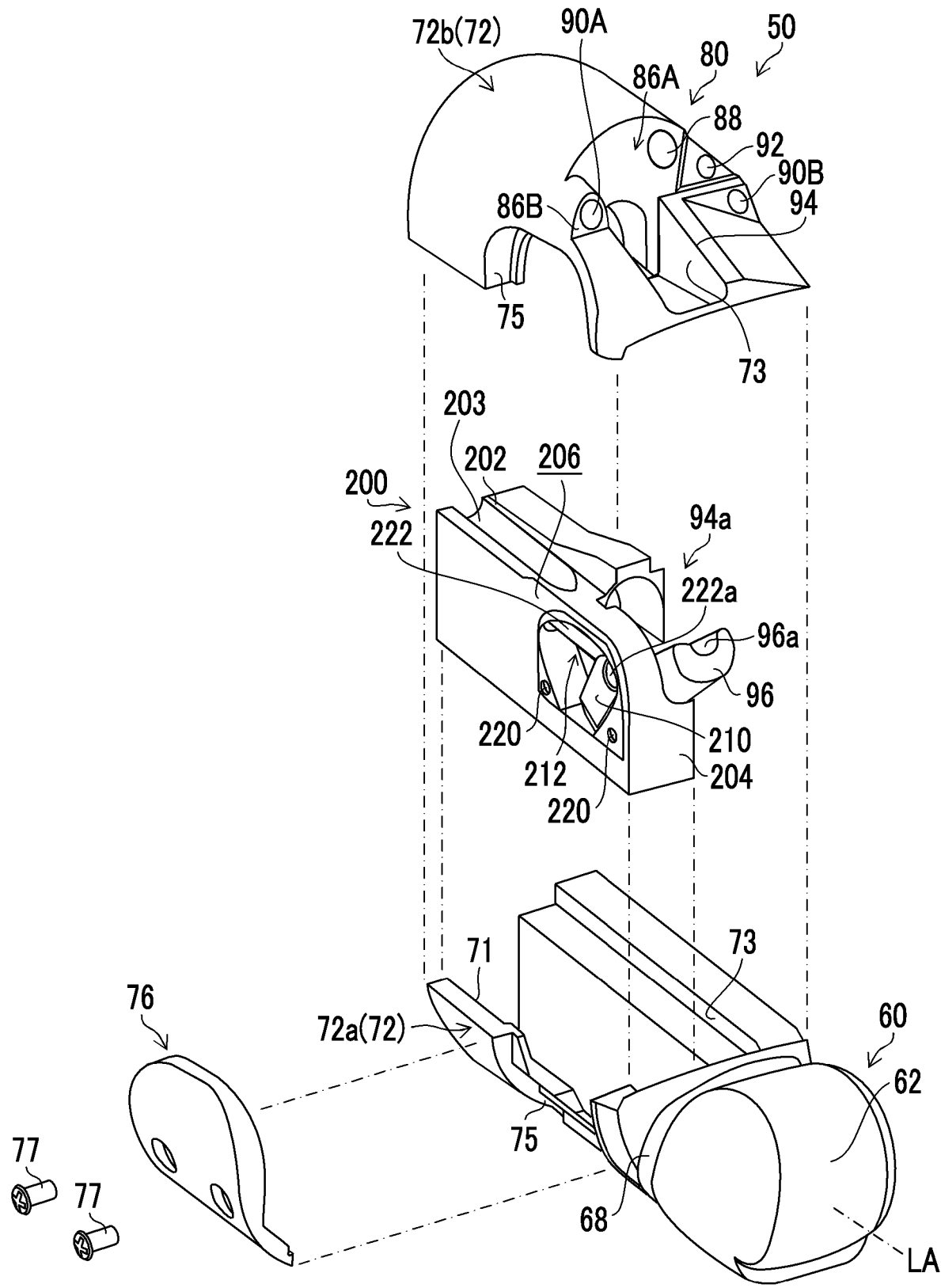
FIG. 5 is an exploded perspective view of the distal end part of the insertion part.

FIG. 3 is an external perspective view of the distal end part 50 of the insertion part 20. FIG. 4 is a right side view of the insertion part 20. FIG. 5 is an exploded perspective view of the distal end part 50 of the insertion part 20. In addition, illustration of the balloon 64 is omitted in FIGS. 3 and 5. Additionally, in FIG. 5, illustration of the light guide 128 is omitted.

As illustrated in FIGS. 3 to 5, the distal end part 50 includes an exterior case 72 (also referred to as a housing) corresponding to a distal end part body of the present invention. The exterior case 72 has a distal end that constitutes the distal end of the insertion part 20, a proximal end that is connected to the bending part 52, and a longitudinal axis LA. Hereinafter, a distal end side of the exterior case 72 is referred to as an "exterior case distal end side", and a proximal end side of the exterior case 72 is referred to as an "exterior case proximal end side".

An ultrasound observation part 60 that acquires an ultrasound detection signal, a treatment tool delivery port 94 for treatment tools, a first inclined surface 86A and a second inclined surface 86B, and an endoscope observation part 80 that acquires an imaging signal are provided from the exterior case distal end side toward the exterior case proximal end side in the exterior case 72. Additionally, an elevator housing chamber 94a and an elevator 96 located inside the treatment tool delivery port 94, and a metallic elevating case 200 (also referred to as an elevator assembly) that rotatably supports the elevator 96 are provided inside the exterior case 72. Moreover, the exterior case 72 includes a lever housing lid 76.

The treatment tool delivery port 94 opens on an outer surface of the exterior case 72 and at a position between the ultrasound observation part 60 and the endoscope observation part 80 (first inclined surface 86A). The treatment tool inserted into the treatment tool insertion channel 100 of the insertion part 20 is delivered from the treatment tool delivery port 94. Hereinafter, as illustrated in FIG. 3, a direction perpendicular to both the longitudinal axis LA and a normal direction NV of an opening surface of the treatment tool delivery port 94 is defined as a width direction WD of the treatment tool delivery port 94, and one direction side in the width direction WD is defined as an L direction side, and the other direction side opposite to the one direction side in the width direction WD is defined as an R direction side.

The first inclined surface 86A and the second inclined surface 86B are inclined surfaces that are inclined toward the exterior case proximal end side from a posture that is parallel to the width direction WD and perpendicular to the longitudinal axis LA. In addition, although described in detail below, the inclination angle of the first inclined surface 86A and the inclination angle of the second inclined surface 86B are different from each other. Additionally, the first inclined surface 86A is provided with an observation window region 86A1, a nozzle region 86A2, and an illumination window region 86A3.

The first inclined surface 86A is formed at a position closer to the exterior case proximal end side than the treatment tool delivery port 94 except for the illumination window region 86A3 in a direction along the longitudinal axis LA in an outer surface of the exterior case 72. Additionally, the first inclined surface 86A is formed from a formation region for the treatment tool delivery port 94 to a region thereof on the L direction side, in the width direction WD in the outer surface of the exterior case 72. An observation window 88, a second illumination window 90B, and an air and water supply nozzle 92 of the endoscope observation part 80 are provided on the first inclined surface 86A.

The second inclined surface 86B is formed, on the outer surface of the exterior case 72, closer to the exterior case distal end side than the observation window region 86A1 of the first inclined surface 86A in the direction along the longitudinal axis LA and in a region closer to the R direction side than the formation region for the treatment tool delivery port 94 in the width direction WD. A first illumination window 90A is provided on the second inclined surface 86B. In addition, the second inclined surface 86B may be formed, in the direction along the longitudinal axis LA, at the same position as the observation window region 86A1, at a position closer to the exterior case proximal end side than the observation window region 86A1, or at a position closer to the exterior case distal end side than the illumination window region 86A3.

The ultrasound observation part 60 is provided at a position closer to the exterior case distal end side than the treatment tool delivery port 94 in the exterior case 72. The ultrasound observation part 60 includes an ultrasound transducer 62 constituted of a plurality of ultrasound vibration elements. Each ultrasound vibration element of the ultrasound transducer 62 is sequentially driven on the basis of a drive signal input from the ultrasound processor device 12. Accordingly, each ultrasound vibration element sequentially generates an ultrasound toward a treatment target region and receives an ultrasound echo (echo signal) reflected by the treatment target region. Then, each ultrasound vibration element outputs an ultrasound detection signal (electrical signal) according to the received ultrasound echo to the ultrasound processor device 12 via a signal cable (not illustrated) inserted into the insertion part 20, the universal cord 24, and the like. As a result, an ultrasound image is generated in the ultrasound processor device 12.

The balloon 64 is attached to the exterior case distal end side with respect to the treatment tool delivery port 94 on the exterior case 72, is formed in a bag shape that covers the ultrasound transducer 62, and prevents attenuation of an ultrasound and an ultrasound echo. The balloon 64 is formed of, for example, a stretchable elastic material such as latex rubber, and a stretchable locking ring 66 is provided at an opening end on the exterior case proximal end side. A locking groove 68 is provided between the ultrasound observation part 60 and the treatment tool delivery port 94 over the entire circumference in the circumferential direction of the exterior case 72 in the exterior case 72. Then, by fitting the locking ring 66 into the locking groove 68, the balloon 64 is attachably and detachably mounted on the exterior case 72.

The endoscope observation part 80 has the observation window 88 provided on the first inclined surface 86A. Although not illustrated, an observation optical system (objective lens or the like), and a charge coupled device (CCD) type or complementary metal oxide semiconductor (CMOS) type imaging element, and the like, which constitute the endoscope observation part 80, are disposed in the exterior case 72 and behind the observation window 88. The imaging element captures an observation image taken from the observation window 88. Then, the imaging element outputs an imaging signal of the observation image to the endoscope processor device 14 via the signal cable (not illustrated) inserted into the insertion part 20, the universal cord 24, and the like. As a result, the endoscope processor device 14 generates an endoscope image.

The first illumination window 90A and the second illumination window 90B emit illumination light toward the front thereof, which will be described in detail below. Emitting ends of the already-described respective light guides 128 are disposed in the exterior case 72 and behind the respective illumination windows 90A and 90B. Therefore, by coupling the light source connector 30 to the light source device 16 as illustrated in the already-described FIG. 2, the illumination light emitted from the light source device 16 is guided to each of the illumination windows 90A and 90B via the light guide 128, and the illumination light is emitted from each of the illumination windows 90A and 90B.

The air and water supply nozzle 92 is connected to one end side of the air and water supply pipe line 102 illustrated in the already-described FIG. 2 and jets a fluid such as water or air toward the observation window 88 in order to clean foreign matters and the like adhering to the surface of the observation window 88.

The exterior case 72 houses the respective parts of the already-described ultrasound observation part 60 and the endoscope observation part 80, and the elevator 96 and the elevating case 200, which will be described below. A portion of the exterior case 72 closer to the exterior case proximal end side than the ultrasound observation part 60 is divided into two parts in an upward-downward direction in the figure with a plane parallel to both the longitudinal axis LA and the width direction WD as a boundary. For this reason, the exterior case 72 is constituted of the exterior case body 72a located on a lower side in the figure and an exterior case lid 72b located on an upper side in the figure.

The exterior case body 72a houses the ultrasound observation part 60 and has the locking groove 68, at a distal end portion closer to the exterior case distal end side than the treatment tool delivery port 94. Additionally, the exterior case body 72a has an opening part 71 that is provided at a portion closer to the exterior case proximal end side than the locking groove 68 and is covered with the exterior case lid 72b (refer to FIG. 5). Also, the exterior case body 72a houses a portion of each of the elevator 96 and the elevating case 200 in the opening part 71.

A groove part 74 (refer to FIG. 4) formed along the longitudinal axis LA and a supply and discharge port 70 opening at an end part of the groove part 74 on the case proximal end side are formed on a side surface of the distal end portion of the exterior case body 72a on the L direction side. Accordingly, water can be supplied to the inside of the balloon 64 through the supply and discharge port 70, or the water inside the balloon 64 can be discharged.

The exterior case lid 72b is attachably and detachably attached to the opening part 71 of the exterior case body 72a. The exterior case lid 72b is formed with the already-described treatment tool delivery port 94, first inclined surface 86A, and second inclined surface 86B from the exterior case distal end side toward the exterior case proximal end side. Additionally, the exterior case lid 72b covers the endoscope observation part 80 and the two light guides 128 that guide illumination light to the respective illumination windows 90A and 90B.

In a case where the exterior case lid 72b is attached to the opening part 71 of the exterior case body 72a, the elevator housing chamber 94a that is a housing space for the elevator 96 is formed inside the treatment tool delivery port 94. Additionally, the exterior case body 72a and the exterior case lid 72b are formed with a partition wall 73 (refer to FIG. 5) that forms a side surface on the L direction side of the elevator housing chamber 94a so as to straddle both.

A fitting hole 75 (refer to FIG. 5) into which the lever housing lid 76 is fitted is formed so as to straddle the exterior case body 72a and the exterior case lid 72b at the position of the elevating case 200 facing a lever housing chamber 212 to be described below (refer to FIG. 5) on the side surfaces of the exterior case body 72a and the exterior case lid 72b on the R direction side.

The elevator housing chamber 94a communicates with the treatment tool insertion port 44 via the already-described treatment tool insertion channel 100 (refer to FIG. 2). For this reason, the treatment tool inserted into the treatment tool insertion port 44 is introduced into the lumen 154 (refer to FIG. 15) from the treatment tool delivery port 94 via the treatment tool insertion channel 100, the elevator housing chamber 94a, and the like.

The elevator 96 is rotatably supported (pivotally supported) on the elevating case 200 via a rotation shaft 216 (refer to FIG. 6) in the elevator housing chamber 94a. The elevator 96 has an arcuate guide surface 96a that guides a treatment tool guided into the elevator housing chamber 94a toward the treatment tool delivery port 94. Accordingly, the elevator 96 changes the direction of the treatment tool guided into the elevator housing chamber 94a from the treatment tool insertion channel 100 and delivers the treatment tool from the treatment tool delivery port 94. Also, although described in detail below, the elevator 96 rotates about a rotation shaft 216 in the elevator housing chamber 94a depending on the operation of the operating lever 43 and thereby changes the delivery direction of a treatment tool introduced into the lumen 154 (refer to FIG. 15) from the treatment tool delivery port 94. Therefore, the elevator 96 controls the delivery direction of the treatment tool from the treatment tool delivery port 94.

The lever housing lid 76 is fitted into the fitting hole 75 on the outer surface of the exterior case 72. The lever housing lid 76 is attachably and detachably attached to the elevating case 200 by a bolt 77 penetrating the lever housing lid 76 in a state where the lever housing lid 76 is fitted in the fitting hole 75 (refer to FIG. 5).

[Configuration of Elevating Case]

Figure 6:
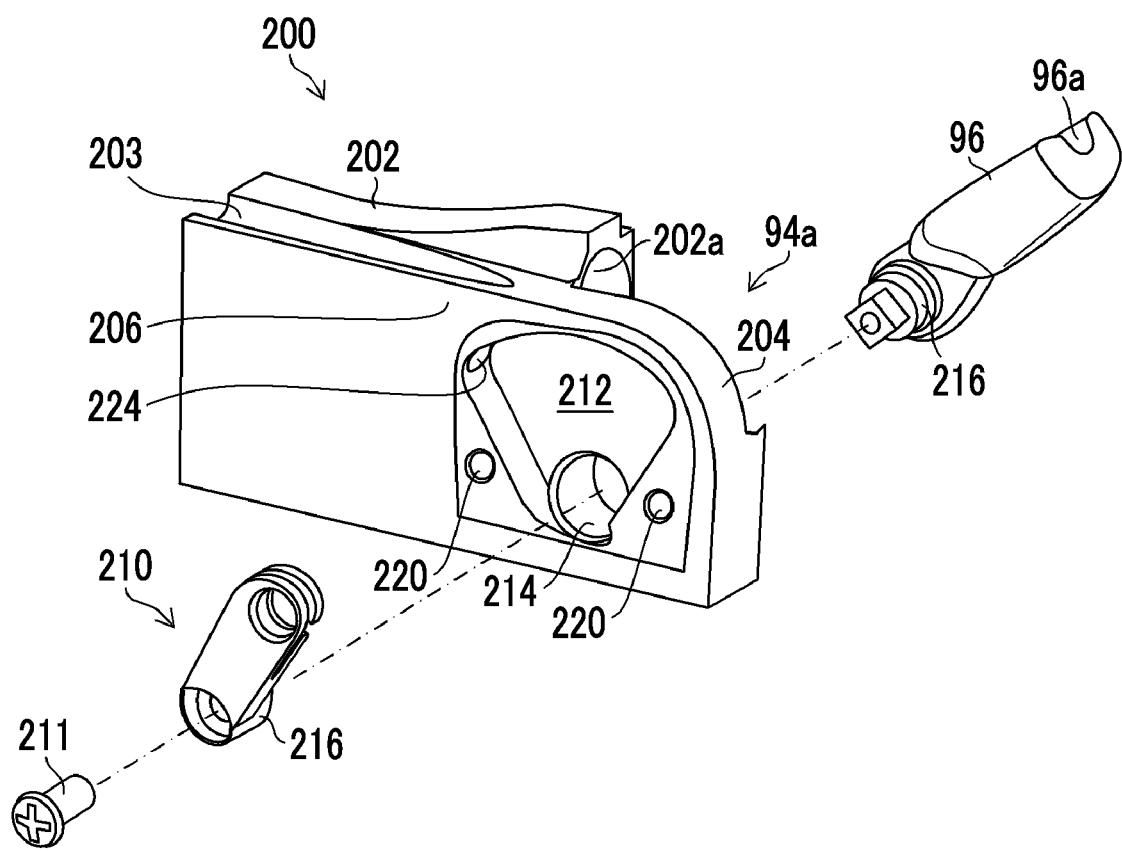
FIG. 6 is a perspective view of an elevating case.
Figure 7:
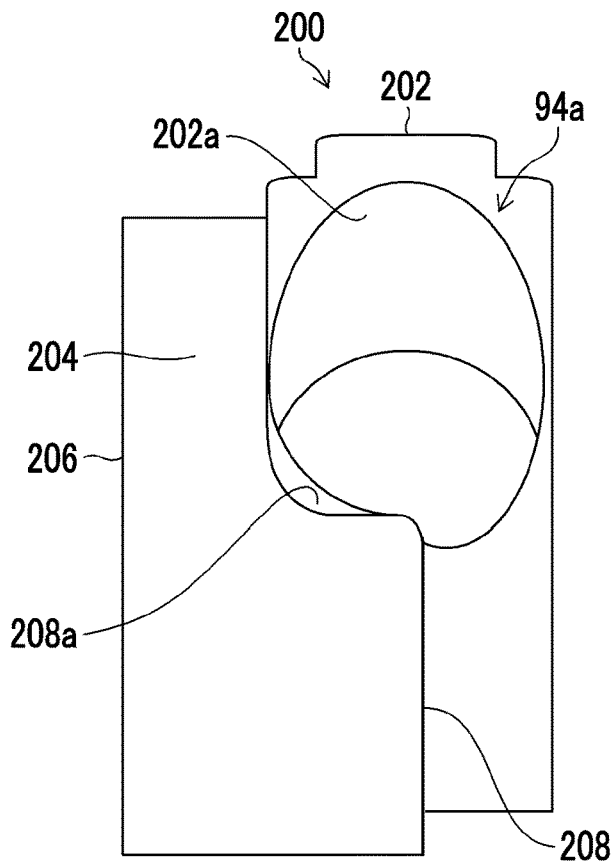
FIG. 7 is a front view of the elevating case in a case where the elevating case is viewed from an exterior case distal end side.
Figure 8:
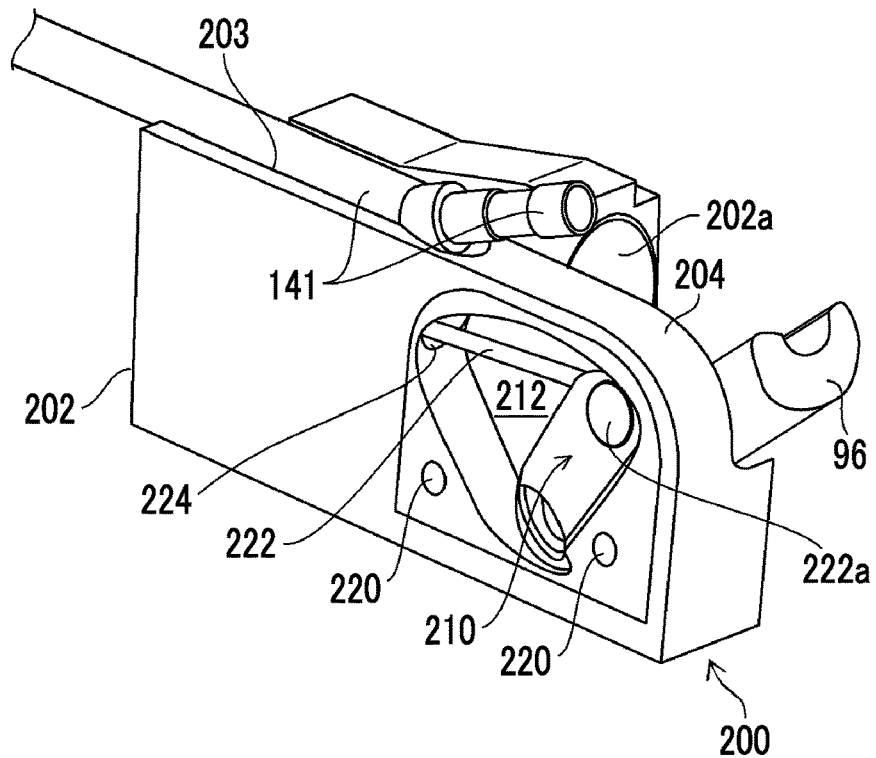
FIG. 8 is a perspective view of the elevating case that holds a light guide.

FIG. 6 is a perspective view of the elevating case 200, and FIG. 7 is a front view of the elevating case 200 in a case where the elevating case 200 is viewed from the exterior case distal end side. FIG. 8 is a perspective view of the elevating case 200 that holds the light guide 128. As illustrated in FIGS. 6 to 8 and the already-described FIG. 5, the elevating case 200 corresponds to an elevator support member of the present invention and is formed of, for example, a metal material having corrosion resistance. The elevating case 200 has a base 202 and a partition wall 204 extending from the base 202 to the exterior case distal end side.

A distal end surface of the base 202 on the exterior case distal end side constitutes a side surface of the elevator housing chamber 94a on the exterior case proximal end side. Additionally, the base 202 is formed with a through hole 202a that is parallel to the longitudinal axis LA and communicates with the elevator housing chamber 94a and the treatment tool insertion channel 100. Accordingly, the treatment tool insertion channel 100 and the elevator housing chamber 94a communicate with each other via the through hole 202a.

A light guide holding groove 203 is formed on an upper surface (a surface on the delivery direction side of the treatment tool) of outer wall surfaces of the base 202. Here, since the first illumination window 90A is disposed on an upward side (a side perpendicular to both the longitudinal axis LA and the width direction WD) of the elevating case 200, the light guide 128 corresponding to the first illumination window 90A is disposed along an upper surface of the base 202. For this reason, the light guide holding groove 203 holds an emitting end of the light guide 128 corresponding to the first illumination window 90A at a position facing the first illumination window 90A. In addition, the light guide 128 corresponding to the first illumination window 90A corresponds to a light guide of the present invention. Additionally, by holding the light guide 128 on the upper surface side of the base 202 by the light guide holding groove 203, the interference between the light guide 128 and an operating wire 222 described below is prevented.

The light guide 128 corresponding to the first illumination window 90A has a light guide distal end part 141 that is a distal end part on the side facing the first illumination window 90A. A distal end portion of the light guide distal end part 141 on the emitting end side is inclined at a first illumination axis angle $\theta 1$ (refer to FIG. 14) described below with respect to a proximal end portion of the light guide distal end part 141 parallel to the longitudinal axis LA. Additionally, a proximal end portion of the light guide distal end part 141 is held by the already-described light guide holding groove 203.

In addition, as already described, the light guide 128 corresponding to the second illumination window 90B is housed at a position away from the base 202 to the L direction side inside the exterior case lid 72b. The distal end portion (emitting end) of the light guide distal end part 141 (not illustrated) of the light guide 128 facing the second illumination window 90B is inclined at a second illumination axis angle $\theta 2$ (refer to FIG. 14) described below with respect to the proximal end portion of the light guide distal end part 141 parallel to the longitudinal axis LA.

The partition wall 204 is provided between the elevator 96 (elevator housing chamber 94a) and an elevator elevating lever 210 (lever housing chamber 212) described below. The partition wall 204 has a side wall surface 206 that is a side surface on the R direction side, and a facing wall surface 208 that is a side surface on the L direction side and faces the elevator 96.

The lever housing chamber 212 that houses the elevator elevating lever 210 is formed on the side wall surface 206. A holding hole 214 (refer to FIG. 6), which penetrates the partition wall 204 in the width direction WD (an axis direction of the rotation shaft 216), is formed in a bottom surface of the lever housing chamber 212 on the elevator 96 side. The holding hole 214 allows the lever housing chamber 212 and the elevator housing chamber 94a to communicate with each other. Also, the holding hole 214 rotatably and pivotably supports the rotation shaft 216. In addition, since the elevator elevating lever 210 in the lever housing chamber 212 rotates (rocks) about the rotation shaft 216, the lever housing chamber 212 is formed in a fan shape about the rotation shaft 216.

A wire insertion hole 224 through which an operating wire 222 is inserted is formed on the side wall surface of the lever housing chamber 212 on the exterior case proximal end side.

A bolt hole 220 into which the already-described bolt 77 is screwed is formed in a peripheral region of the lever housing chamber 212 and a region covered with the lever housing lid 76, in the side wall surface 206. In addition, the numbers of bolts 77 and bolt holes 220 are not particularly limited.

The facing wall surface 208 constitutes a side surface of the elevator housing chamber 94a on the R direction side. A holding hole 214 opens in the facing wall surface 208. Additionally, the facing wall surface 208 is formed with a cutout part 208a (refer to FIG. 7) into which a portion of the elevator 96 is inserted.

The elevator elevating lever 210 rotates the elevator 96 about the rotation shaft 216 depending on the operation of the operating lever 43. One end part of the elevator elevating lever 210 is provided with one of the rotation shafts 216 having a two-split structure, and the operating wire 222 is coupled to the other end part of the elevator elevating lever 210.

One of the rotation shaft 216 having a two-split structure is provided at one end part of the elevator elevating lever 210 as already described, and the other thereof is provided at one end part of the elevator 96. Also, the elevator elevating lever 210 and the elevator 96 are coupled to each other via the rotation shafts 216 having a two-split structure. For example, in the present embodiment, by using the bolt 211 penetrating one end side of the elevator elevating lever 210 to couple one side and the other side of the rotation shafts 216 having a two-split structure, the elevator elevating lever 210 and the elevator 96 are coupled to each other via the rotation shaft 216 (refer to FIG. 6). Accordingly, the elevator elevating lever 210 rotates (rocks) integrally with the elevator 96 about the rotation shaft 216.

The operating wire 222 has a distal end side coupling part 222a that is coupled to the elevator elevating lever 210 inside the lever housing chamber 212, at one end side thereof. Additionally, the other end side of the operating wire 222 is coupled to an elevator operating mechanism 226 (refer to FIG. 9) in the operating part 22 through the insertion part 20 from a wire insertion hole 224 of the lever housing chamber 212.

Figure 9:
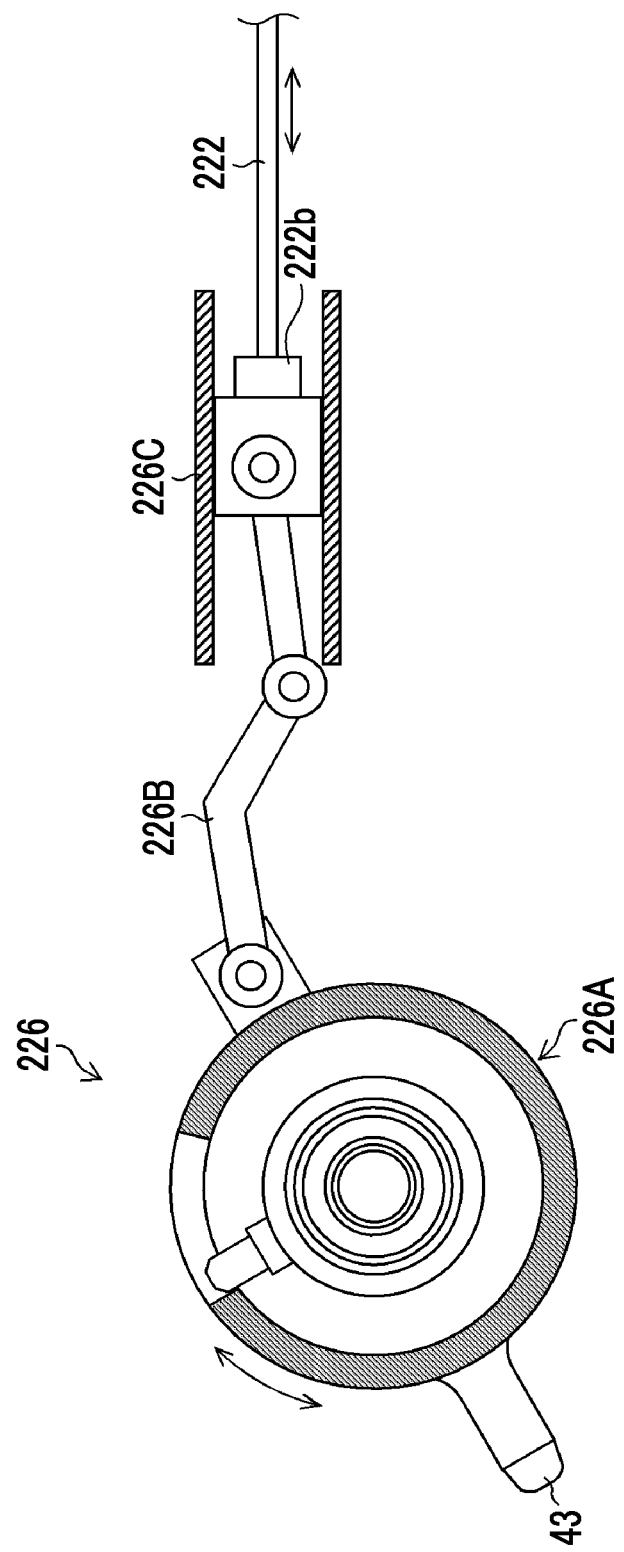
FIG. 9 is a schematic view illustrating an example of an elevator operating mechanism.

FIG. 9 is a schematic view illustrating an example of the elevator operating mechanism 226. As illustrated in FIG. 9, the operating wire 222 has a proximal end side coupling part 222b coupled to the elevator operating mechanism 226, on the proximal end side thereof. The elevator operating mechanism 226 includes the operating lever 43, a rotating drum 226A that is coupled to the operating lever 43 and is rotatable within a certain angle range, a crank member 226B coupled to the rotating drum 226A, and a slider 226C coupled to the crank member 226B. The proximal end side coupling part 222b is coupled to the slider 226C.

In a case where the operating lever 43 is operated to rotate the rotating drum 226A, the operating wire 222 is pushed and pulled via the crank member 226B and the slider 226C, whereby the elevator elevating lever 210 rocks, and the elevator 96 rotates (rocks) about the rotation shaft 216 depending on the rocking of the elevator elevating lever 210.

Figure 10A:
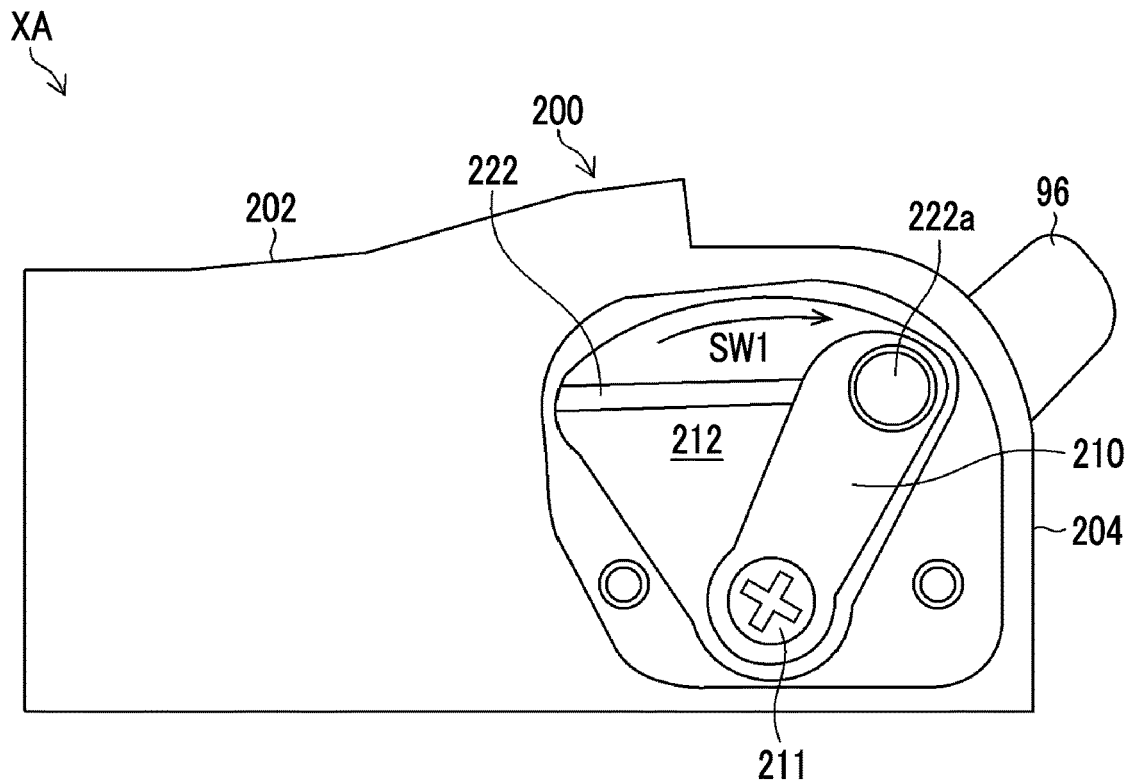
FIGS. 10A and 10B are explanatory views for explaining the rotation of the elevator according to the operation of an operating lever.
Figure 10B:
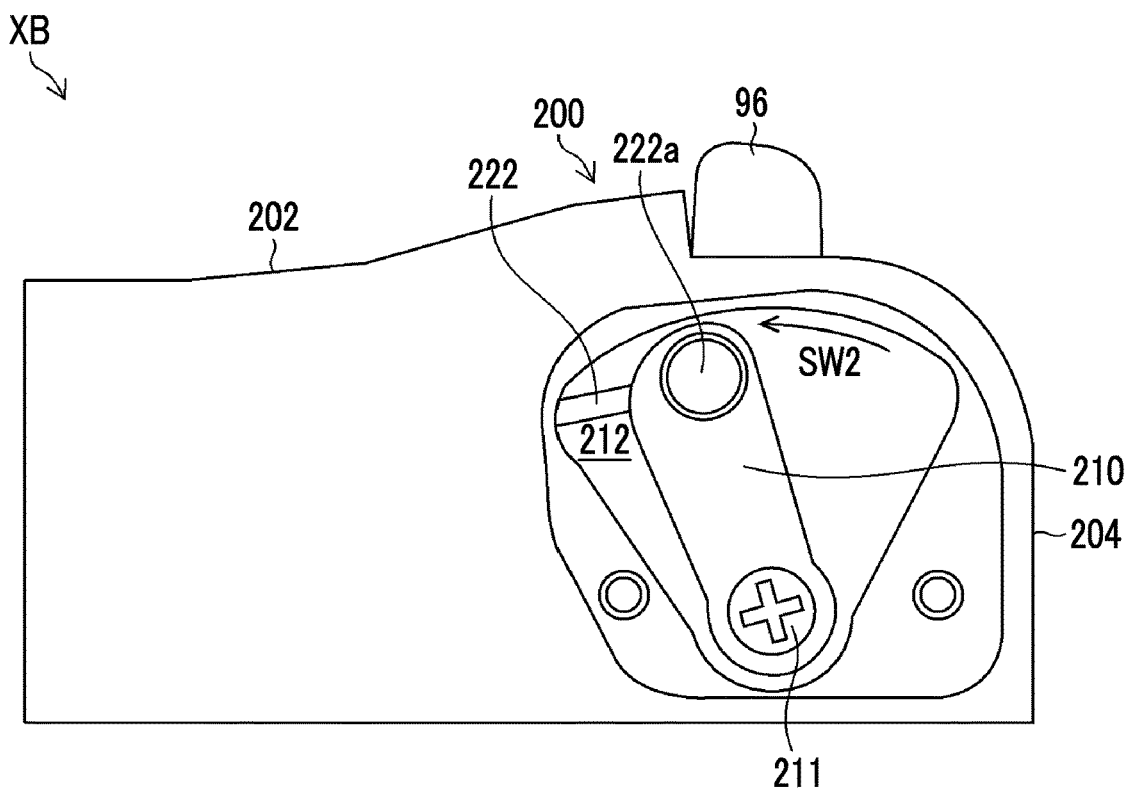

FIGS. 10A and 10B are explanatory views for explaining the rotation of the elevator 96 according to the operation of the operating lever 43. As indicated by reference numeral XA in FIG. 10A, in a case where the operating lever 43 is operated to rotate the rotating drum 226A in one direction, the operating wire 222 is pushed, and thereby, the elevator elevating lever 210 rotates about the rotation shaft 216 in an SW1 direction. Accordingly, the elevator 96 is rotated in a lodged position along with this rotation.

As indicated by reference numeral XB in FIG. 10B, in a case where the operating lever 43 is operated to rotate the rotating drum 226A in the opposite direction, the operating wire 222 is pulled, and the elevator elevating lever 210 rotates about the rotation shaft 216 in an SW2 direction opposite to the SW1 direction. Accordingly, the elevator 96 is rotated to an elevated position along with this rotation. In this way, by rotating the rotation shaft 216 via the operating wire 222, the elevator elevating lever 210, and the like through the operation of the operating lever 43, the elevator 96 can be displaced (elevated and lodged).

[First Inclined Surface, Respective Illumination Windows, and Observation Window]

Figure 11:
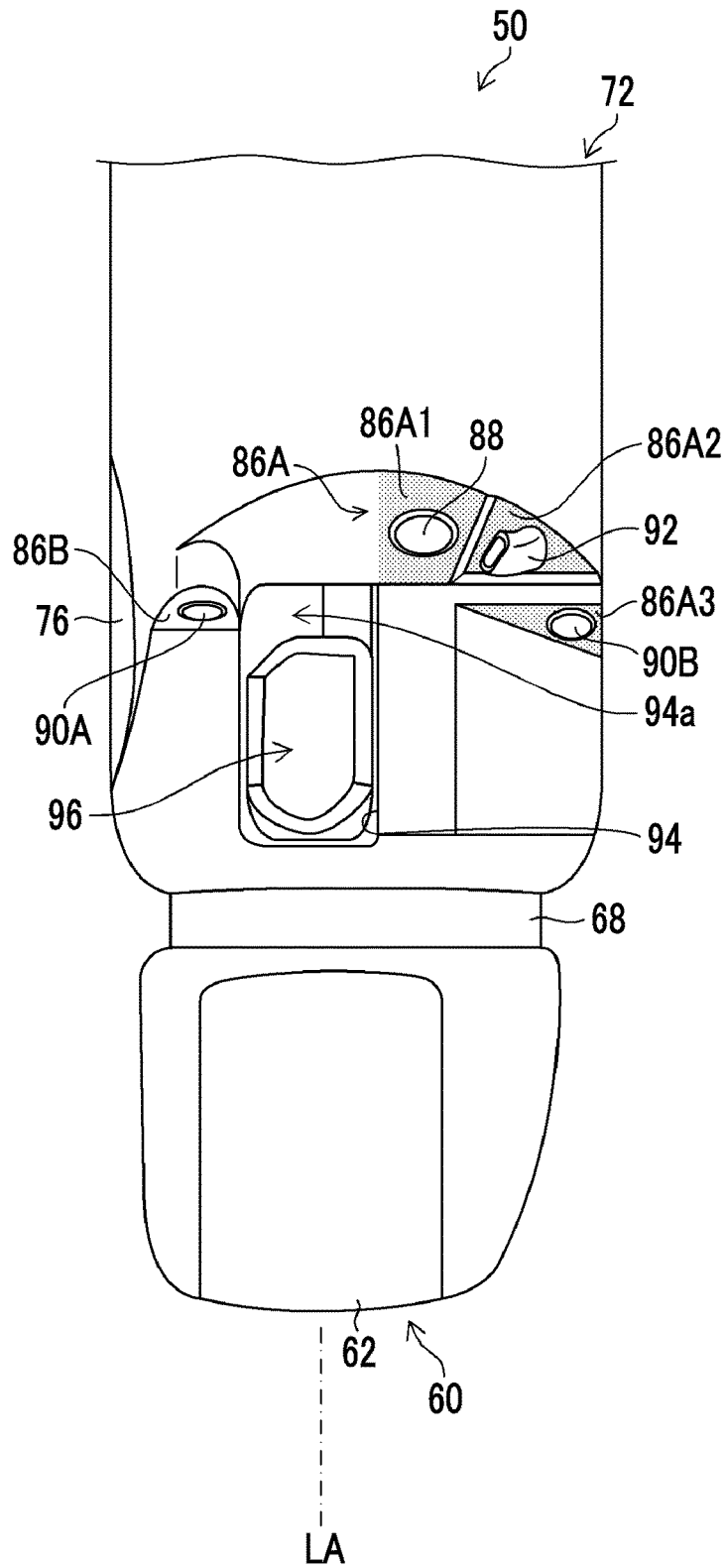
FIG. 11 is a top view of an exterior case.

FIG. 11 is a top view of the exterior case 72. As illustrated in FIG. 11, the first illumination window 90A is provided on the second inclined surface 86B of the already-described exterior case 72. Although described in detail below, the first illumination window 90A is different from the second illumination window 90B in the emission direction of the illumination light.

The observation window 88, the air and water supply nozzle 92, and the second illumination window 90B are provided on the first inclined surface 86A of the already-described exterior case 72. The first inclined surface 86A has the already-described observation window region 86A1, nozzle region 86A2, and illumination window region 86A3 that are parallel to each other. In addition, in FIG. 11 and FIG. 12 described below, the observation window region 86A1, the nozzle region 86A2, and the illumination window region 86A3 are represented by dot display. Hereinafter, a side opposite to the normal direction of the first inclined surface 86A is referred to as a normal line opposite direction.

Figure 12:
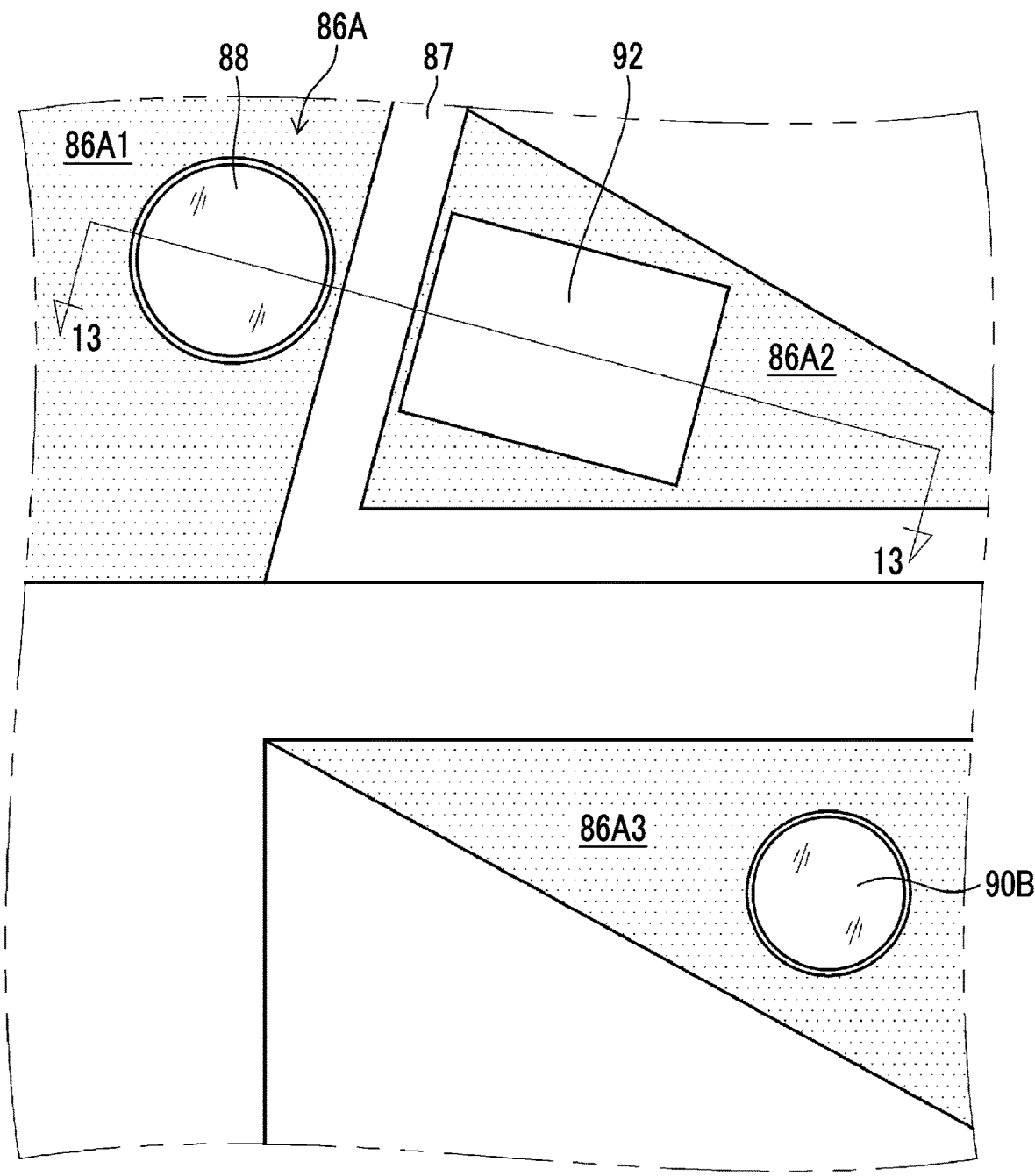
FIG. 12 is an enlarged front view of a portion of a first inclined surface as seen from a normal direction side thereof.
Figure 13:
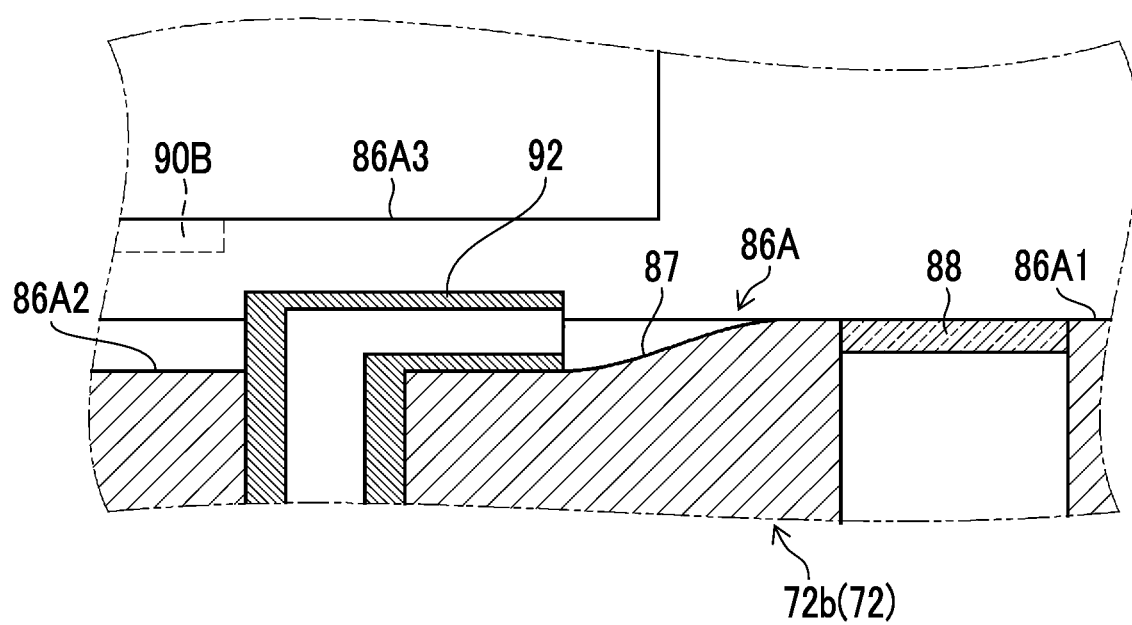
FIG. 13 is a cross-sectional view taken along line "13-13" in FIG. 12.

FIG. 12 is an enlarged front view of a portion of the first inclined surface 86A as seen from the normal direction side. FIG. 13 is a cross-sectional view taken along line "13-13" in FIG. 12.

As illustrated in FIGS. 12 and 13, as illustrated in the already-described FIG. 11, the observation window region 86A1 is formed, on the first inclined surface 86A, at a position closer to the exterior case proximal end side than the treatment tool delivery port 94 in the direction along the longitudinal axis LA and at a position on the L direction side with respect to the treatment tool delivery port 94 in the width direction WD. The observation window region 86A1 is provided with the observation window 88.

Since the observation window 88 is provided in the observation window region 86A1, the observation window 88 is located closer to the exterior case proximal end side than the treatment tool delivery port 94 in the exterior case 72. Accordingly, a treatment tool delivered from the treatment tool delivery port 94 and a treatment target region can be observed through the observation window 88 regardless of the rotational position of the elevator 96. As a result, the visibility of the treatment tool and the treatment target region is improved.

The nozzle region 86A2 is formed, on the first inclined surface 86A, at a position closer to the normal line opposite direction side than the observation window region 86A1 and at a position on the L direction side with respect to the observation window region 86A1 in the width direction WD. The nozzle region 86A2 is shifted most to the normal line opposite direction side in the first inclined surface 86A. Also, the nozzle region 86A2 is provided with the already-described air and water supply nozzle 92.

Since the air and water supply nozzle 92 is provided in the nozzle region 86A2, the air and water supply nozzle 92 is located on the L direction side with respect to the observation window 88. As already described, the air and water supply nozzle 92 cleans the observation window 88 by jetting a fluid such as water or air onto the observation window 88.

Between the observation window region 86A1 and the nozzle region 86A2 is formed an inclined surface 87 (slope) that connects both. Accordingly, a fluid jetted from the air and water supply nozzle 92 toward the observation window 88 is diffused by the inclined surface 87. As a result, a wide region including the observation window 88 and its edge part can be cleaned.

The illumination window region 86A3 is formed, on the first inclined surface 86A, at a position closer to the normal direction side of the first inclined surface 86A than a top part of the air and water supply nozzle 92 and at a position closer to the L direction side than the treatment tool delivery port 94 in the width direction WD. The illumination window region 86A3 is shifted most toward the normal direction side of the first inclined surface 86A in the first inclined surfaces 86A. Also, the illumination window region 86A3 is provided with a second illumination window 90B.

Since the nozzle region 86A2 is shifted most to the normal line opposite direction side in the observation window region 86A1, the nozzle region 86A2, and the illumination window region 86A3, the air and water supply nozzle 92 is provided in a recessed region (nozzle region 86A2) in the first inclined surface 86A. As a result, the contact between the air and water supply nozzle 92 provided in the nozzle region 86A2 and an inner wall of the lumen 154 (refer to FIG. 15) is reliably prevented.

Additionally, by shifting the illumination window region 86A3 toward the normal direction side of the first inclined surface 86A with respect to the top part of the air and water supply nozzle 92, the illumination light emitted from the second illumination window 90B is prevented from being blocked by the air and water supply nozzle 92 even in a case where the second illumination window 90B and the air and water supply nozzle 92 is brought closer to each other.

Moreover, by shifting the illumination window region 86A3 toward the normal direction side of the first inclined surface 86A with respect to the observation window region 86A1 (observation window 88), even in a case where water droplets or the like adhere to the surface of the second illumination window 90B and the illumination light emitted from the second illumination window 90B is refracted due to the water droplets or the like, the illumination light is prevented from directly entering the observation window 88. Accordingly, an unintended flare is prevented from occurring in an endoscope image.

Figure 14:
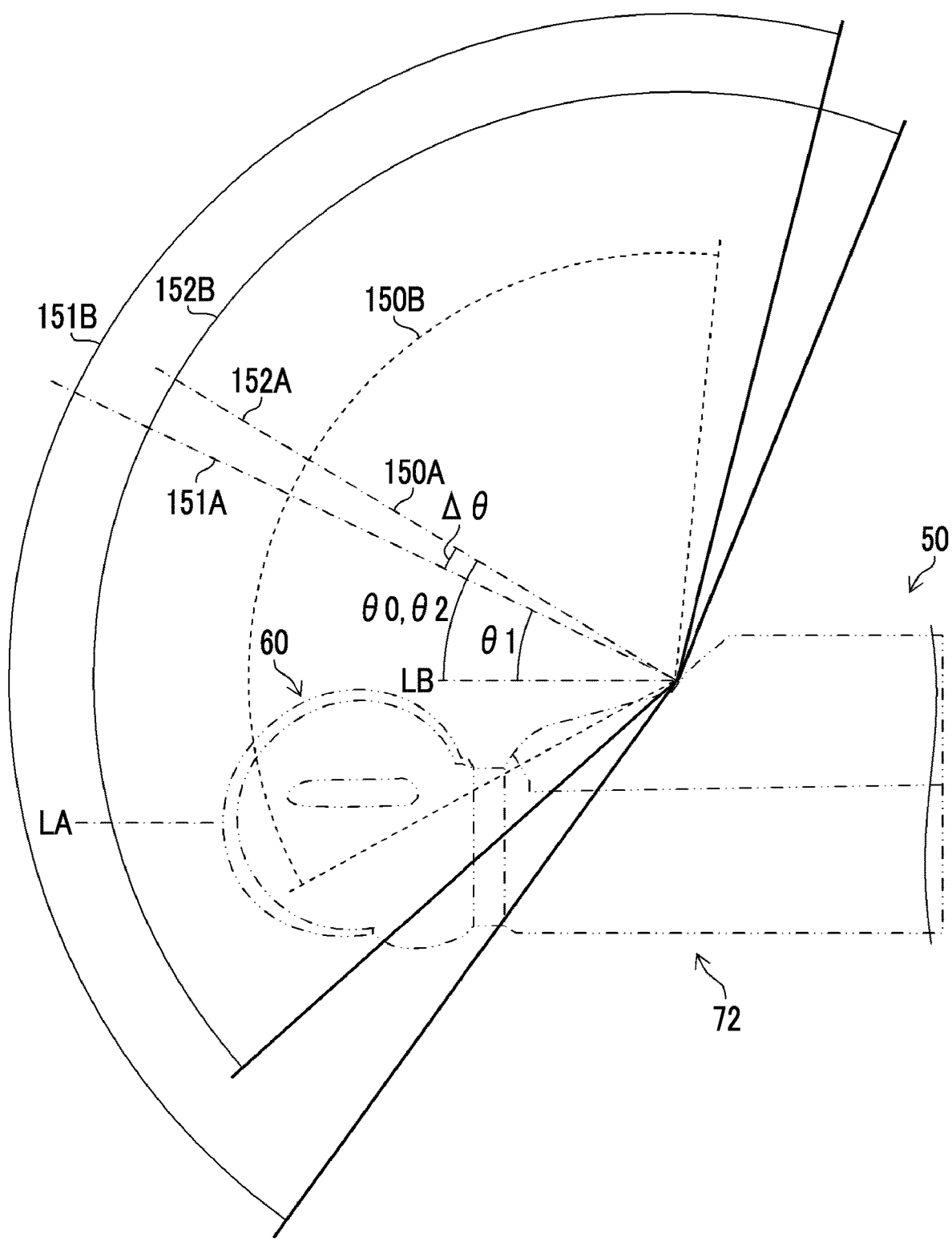
FIG. 14 is an explanatory view for explaining an observation axis and an observation range of the observation window, a first illumination axis and a first illumination range of a first illumination window, and a second illumination axis and a second illumination range of a second illumination window.

FIG. 14 is an explanatory view for explaining an observation axis 150A and an observation range 150B of the observation window 88, a first illumination axis 151A and a first illumination range 151B of the first illumination window 90A, and a second illumination axis 152A and a second illumination range 152B of the second illumination window 90B. In addition, in FIG. 14 (the same applies to FIG. 15 described below), in order to prevent the drawing from becoming complicated, the respective axes and the respective ranges will be described assuming that the observation window 88 and the illumination windows 90A and 90B are at the same position.

As illustrated in FIG. 14, the observation axis 150A is an axis extending from the observation window 88 in a normal direction thereof, the first illumination axis 151A is an axis extending from the first illumination window 90A in the normal direction thereof, and the second illumination axis 152A is an axis extending from the second illumination window 90B in the normal direction thereof. Additionally, each of the observation axis 150A, the first illumination axis 151A, and the second illumination axis 152A is an inclined axis that is inclined toward the exterior case distal end side from the posture perpendicular to both the width direction WD and the longitudinal axis LA. In addition, the observation axis 150A and the second illumination axis 152A are parallel to the normal line of the first inclined surface 86A (the observation window region 86A1, the nozzle region 86A2, and the illumination window region 86A3), and the first illumination axis 151A is parallel to the normal line to the second inclined surface 86B.

An observation axis angle θ0 is the inclination angle of the observation axis 150A with respect to a reference axis LB parallel to the longitudinal axis LA as seen from the width direction WD side (the side perpendicular to the paper surface). A first illumination axis angle θ1 is the inclination angle of the first illumination axis 151A with respect to the reference axis LB as seen from the width direction WD side. A second illumination axis angle θ2 is the inclination angle of the second illumination axis 152A with respect to the reference axis LB as seen from the width direction WD side. In addition, the reference axis LB is an axis that intersects the observation axis 150A in the case of the observation axis angle θ0, an axis that intersects the first illumination axis 151A in the case of the first illumination axis angle θ1, and an axis that intersects the second illumination axis 152A in the case of the second illumination axis angle θ2.

As seen from the width direction WD side, the observation axis angle θ0 and the observation range 150B are respectively set to values such that an angle range from one to the other of the exterior case distal end side of the exterior case 72 [the insertion direction side of the insertion part 20 (the traveling direction side)] and the treatment tool the delivered from the treatment tool delivery port 94 and the treatment target region thereof can be observed through the observation window 88. In addition, it is preferable that the observation axis angle θ0 and the observation range 150B are values that allow observation of the treatment tool delivered from the treatment tool delivery port 94 and the treatment target region thereof in a state where the elevator 96 is rotated to the elevated position.

Since the first illumination axis angle θ1 is smaller than the observation axis angle θ0 (second illumination axis angle θ2), the first illumination axis 151A is inclined toward the exterior case distal end side with respect to the observation axis 150A. In other words, the second inclined surface 86B has an inclination angle closer to an angle perpendicular to the reference axis LB than the first inclined surface 86A (observation window region 86A1).

It is preferable that the first illumination range 151B includes at least the observation range 150B as seen from the width direction WD side. Accordingly, the first illumination window 90A can illuminate the above-described angle range (observation range 150B) with illumination light. Accordingly, the insertion direction side of the insertion part 20 and the treatment tool delivered from the treatment tool delivery port 94 and the treatment target region thereof can be illuminated with the illumination light emitted from the first illumination window 90A.

Since the second illumination axis angle θ2 and the observation axis angle θ0 are equal to each other (including substantially equal), the second illumination axis 152A and the observation axis 150A are parallel to each other (including substantially parallel). Also, it is preferable that the second illumination range 152B includes at least the observation range 150B as seen from the width direction WD side. Accordingly, the second illumination window 90B can illuminate the above-described angle range (observation range 150B) with illumination light.

In addition, in a case where the difference between the first illumination axis angle θ1 and the observation axis angle θ0 (second illumination axis angle θ2) is Δθ, the first illumination range 151B is inclined toward the exterior case distal end side by a difference Δθ with respect to the second illumination range 152B. Therefore, the second illumination range 152B partially overlaps the first illumination range 151B. Also, the difference Δθ is set to a value such that the observation range 150B is included in the first illumination range 151B, that is, a value such that the treatment tool and the treatment target region thereof can be illuminated with the illumination light emitted from the first illumination window 90A. For example, in a case where the irradiation angle of the first illumination window 90A corresponding to the first illumination range 151B is L and the viewing angle of the observation window 88 corresponding to the observation range 150B is θC, the difference Δθ satisfies Δθ<θL/2−θC/2.

FIG. 15 is a side view of the distal end part 50 of the insertion part 20 inserted into the lumen 154. As illustrated in FIG. 15 and the already-described FIG. 14, by inclining the first illumination window 90A (first illumination axis 151A) toward the exterior case distal end side by the difference Δθ with respect to the observation window 88 (observation axis 150A) and the second illumination window 90B (second illumination axis 152A), it is possible to increase the illumination light amount of the illumination light with which the first illumination window 90A illuminates the insertion direction side of the insertion part 20. As a result, for example, in a case where the insertion part 20 is inserted into the narrow lumen 154, the visibility (forward visibility) of an inner wall of the lumen 154 on the insertion direction side of the insertion part 20 is improved.

Moreover, by inclining the first illumination window 90A toward the exterior case distal end side by the difference Δθ with respect to the second illumination window 90B, for example, in a case where an inner wall surface of the narrow lumen 154 such as the duodenum is illuminated, the illumination light amount of the illumination light emitted from the first illumination window 90A to the inner wall surface can be made smaller than the illumination light amount of the illumination light emitted from the second illumination window 90B to the inner wall surface. Accordingly, it is possible to reduce the illumination light amount of the illumination light with which the inner wall surface of the lumen 154 is irradiated, as compared to a case where the first illumination axis angle θ1 has the same size as the second illumination axis angle θ2. As a result, it is possible to prevent the occurrence of halation in the endoscope image due to the excessive illumination light amount of the illumination light on the inner wall surface of the lumen 154. In addition, the illumination only by the first illumination window 90A may be selectively performed as necessary.

By inclining the second illumination window 90B (the second illumination axis 152A and the second illumination range 152B) toward the exterior case proximal end side by the difference Δθ with respect to the first illumination window 90A (the first illumination axis 151A and the first illumination range 151B), it is possible to increase the illumination light amount of the illumination light with which the second illumination window 90B illuminates the treatment tool delivered from the treatment tool delivery port 94 and the treatment target region thereof. As a result, since the treatment tool and the treatment target region can be reliably illuminated with the illumination light, the visibility of the treatment tool and the treatment target region can be improved.

In this way, by combining the first illumination window 90A with the second illumination window 90B, it is possible to improve the forward visibility of the insertion part 20 and the visibility of the treatment tool and the treatment target region.

Figure 16:
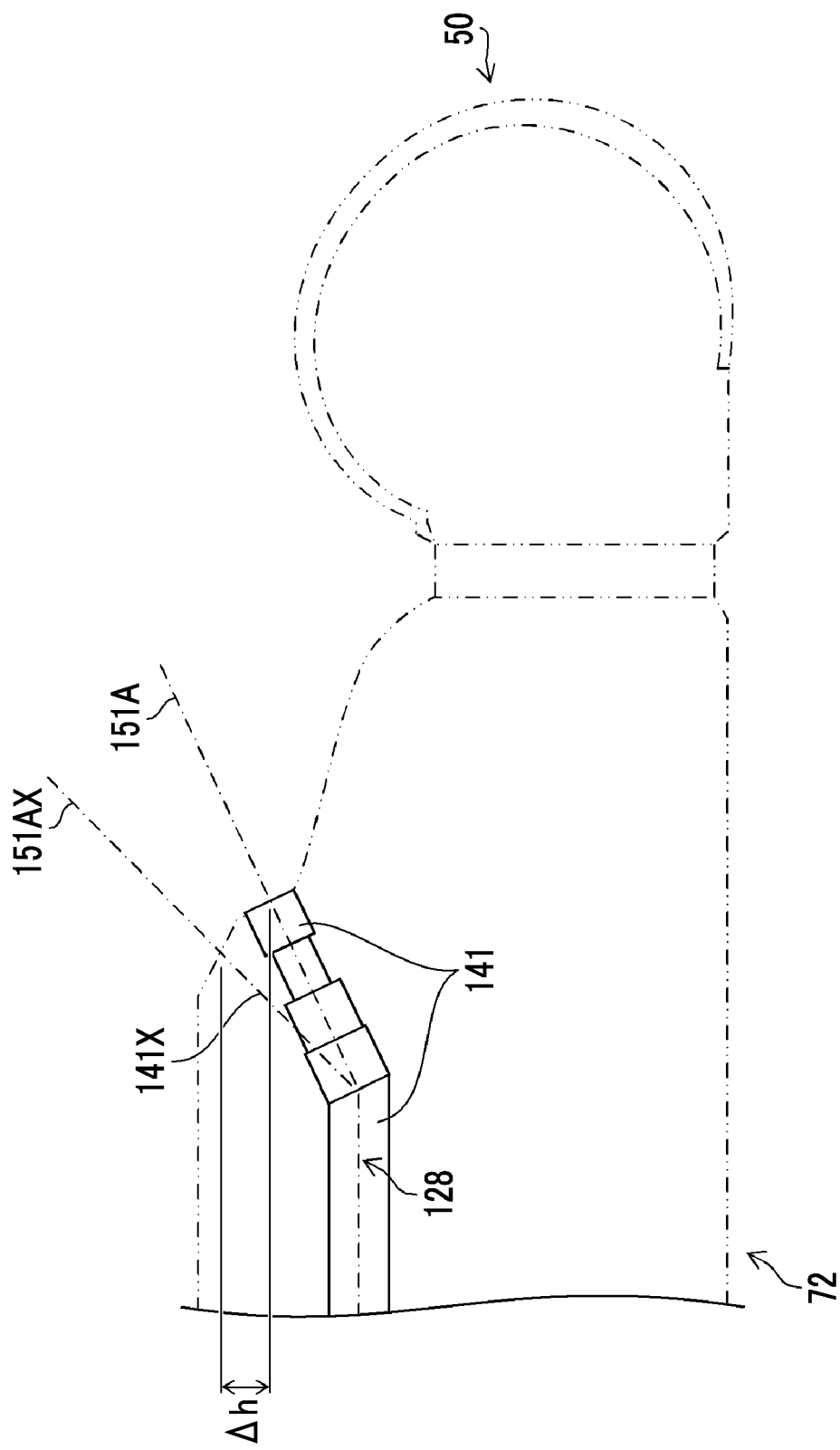
FIG. 16 is an explanatory view for explaining a reduction in diameter of the distal end part of the insertion part.

FIG. 16 is an explanatory view for explaining a reduction in diameter of the distal end part 50 of the insertion part 20. In addition, reference numeral 141X in the drawing denotes a light guide distal end part of the light guide 128 corresponding to a related-art first illumination window (not illustrated) having a first illumination axis 151AX parallel to the observation axis 150A (second illumination axis 152A).

Since the light guide distal end part 141 of the light guide 128 corresponding to the first illumination window 90A is held in the light guide holding groove 203 formed on the upper surface of the base 202, the light guide distal end part 141 is disposed in a narrow space between on the upper surface of the base 202 and an inner surface of the exterior case lid 72b. For this reason, as the inclination angle of the light guide distal end part 141 corresponding to the first illumination window 90A increases, it is necessary to ensure a wider space for disposing the light guide distal end part 141 between the upper surface of the base 202 and the inner surface of the exterior case lid 72b. As a result, since the diameter of the distal end part 50 is increased, the inclination angle of the light guide distal end part 141 corresponding to the first illumination window 90A affects an increase in diameter of the distal end part 50.

On the other hand, the light guide distal end part 141 of the light guide 128 corresponding to the second illumination window 90B is disposed inside the exterior case lid 72b and in a large disposition space on the L direction side of the base 202. For this reason, even in a case where the inclination angle of the light guide distal end part 141 corresponding to the second illumination window 90B is increased, the light guide distal end part 141 can be disposed with a margin in the disposition space. Therefore, the inclination angle of the light guide distal end part 141 corresponding to the second illumination window 90B does not particularly affect an increase in diameter of the distal end part 50.

Thus, as illustrated in FIG. 16, in the present embodiment, by inclining the first illumination axis 151A of the first illumination window 90A toward the exterior case distal end side by the difference Δθ with respect to the first illumination axis 151AX (observation axis 150A), the space for disposing the light guide distal end part 141 corresponding to the first illumination window 90A can be reduced by Δh in the drawing in the radial direction of the distal end part 50. As a result, the diameter of the distal end part 50 of the insertion part 20 can be reduced.

Effects of Present Embodiment

As described above, in the present embodiment, since the first illumination axis angle θ1 is smaller than the observation axis angle θ0, the illumination light amount with which the insertion direction side of the insertion part 20 is illuminated can be increased, and the illumination light amount of the illumination light emitted the inner wall surface of the lumen 154 can be reduced. Accordingly, the forward visibility on the insertion direction side of the insertion part 20 is improved, and the illumination light amount of the illumination light on the inner wall surface of the lumen 154 is prevented from becoming excessive. As a result, it is possible to appropriately illuminate the insertion direction side of the insertion part 20, the treatment tool, and the treatment target region thereof. Additionally, since the inclination angle of the light guide distal end part 141 corresponding to the first illumination window 90A in the exterior case 72 is reduced, the distal end part 50 of the insertion part 20 can be made smaller in diameter.

Additionally, in the present embodiment, by making the second illumination axis angle θ2 larger than the first illumination axis angle θ1, it is possible to increase the illumination light amount of the illumination light with which the second illumination window 90B illuminates the treatment tool delivered from the treatment tool delivery port 94 and the treatment target region thereof. As a result, it is possible to reliably illuminate the treatment tool and the treatment target region thereof with the illumination light from the second illumination window 90B.

[Others]

Figure 17:
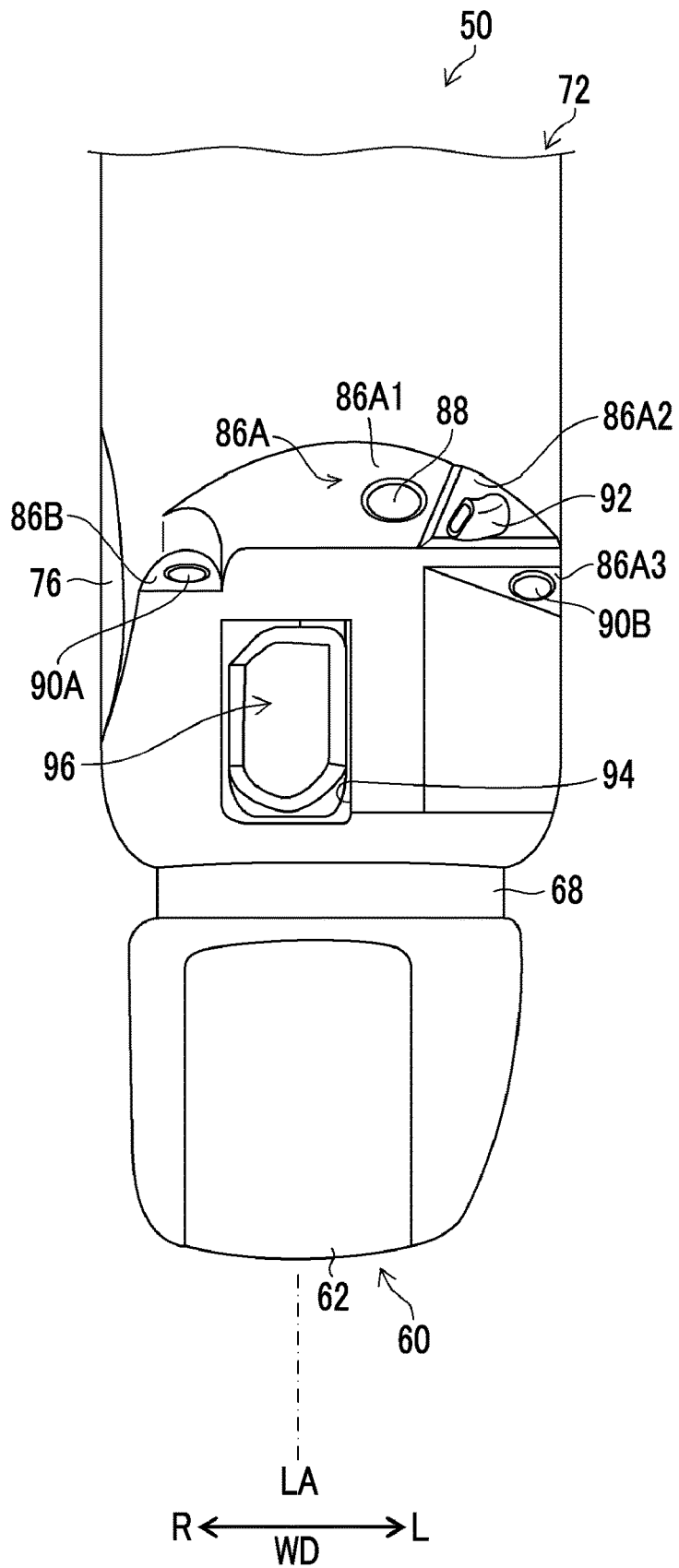
FIG. 17 is a top view of an exterior case of another embodiment.

FIG. 17 is a top view of the exterior case 72 of another embodiment. In the above embodiment (for example, refer to FIG. 11), the illumination windows 90A and 90B are formed at a position closer to the exterior case distal end side than the opening edge of the treatment tool delivery port 94 on the exterior case proximal end side on the outer surface of the exterior case 72. In contrast, for example, as illustrated in FIG. 17, the illumination windows 90A and 90B may be formed at a position closer to the exterior case proximal end side than the treatment tool delivery port 94 on the outer surface of the exterior case 72. Accordingly, the treatment tool delivered from the treatment tool delivery port 94 and the treatment target region thereof can be reliably illuminated with the illumination light emitted from each of the illumination windows 90A and 90B. As a result, the visibility of the treatment tool and the treatment target region through the observation window 88 can be improved.

In the above embodiment, the second illumination axis angle θ2 of the second illumination axis 152A of the second illumination window 90B is less than 90°. However, the second illumination axis angle θ2 may be 90 (approximately 90°) depending on the size of the second illumination range 152B. That is, at least the illumination window region 86A3 of the first inclined surface 86A may be a surface parallel to the longitudinal axis LA.

In the above embodiment, the observation window 88 is provided at a position closer to the exterior case proximal end side than the treatment tool delivery port 94 on the outer surface of the exterior case 72. However, the observation window 88 may be formed at a position shifted from a position on the exterior case proximal end side to the exterior case distal end side and at a position on the L direction side of the treatment tool delivery port 94. However, in order to always observe the treatment tool delivered from the treatment tool delivery port 94 and the treatment target region thereof, it is preferable to form the observation window 88 at a position closer to the exterior case proximal end side than the treatment tool delivery port 94.

In the above embodiment, the second illumination window 90B is formed on the illumination window region 86A3 of the first inclined surface 86A. However, the formation position of the second illumination window 90B is not particularly limited. Additionally, in the above embodiment, the second illumination axis angle θ2 is larger than the first illumination axis angle θ1. However, the second illumination axis angle θ2 may be smaller than the first illumination axis angle θ1 or both may be equal to each other. Moreover, the second illumination window 90B may be omitted as long as the already-described forward visibility and the visibility of the treatment tool and the treatment target region can be ensured only with the first illumination window 90A.

In the above embodiment, the observation axis 150A and the second illumination axis 152A are parallel to each other but both may not be parallel to each other. For example, the observation axis angle θ0 may be an angle between the first illumination axis angle θ1 and the second illumination axis angle θ2.

In the above-described embodiment, an example in which the elevator 96 is rotated via the operating wire 222 and the elevator elevating lever 210 has been described. However, the method of rotating the elevator 96 is not particularly limited, and a publicly known method can be adopted.

In the above-described embodiment, the observation window region 86A1, the nozzle region 86A2, and the illumination window region 86A3 that are different from each other are formed in the first inclined surface 86A. However, the observation window region 86A1, the nozzle region 86A2, and the illumination window region 86A3 may be formed on the same plane without steps.

In the above embodiment, the light guide holding groove 203 formed on the upper surface of the elevating case 200 holds the light guide distal end part 141 corresponding to the first illumination window 90A. However, the structure in which the light guide distal end part 141 is held by the elevating case 200 is not particularly limited. For example, a through hole may be provided in the base 202 of the elevating case 200, and the light guide distal end part 141 may be inserted and held in the through hole.

In the above embodiment, the first illumination window 90A and the second inclined surface 86B are parallel to each other. However, the first illumination window 90A may be provided not to be parallel to the second inclined surface 86B. Additionally, similarly, the observation window 88 and the second illumination window 90B may be provided not to be parallel to the first inclined surface 86A.

In the above embodiment, the ultrasound endoscope 10 including the ultrasound observation part 60 (ultrasound transducer 62) has been described as an example. However, the present invention can also be applied to an endoscope including the elevator 96 that guides the treatment tool, for example other side-view endoscopes such as a duodenoscope.

EXPLANATION OF REFERENCES

2: ultrasound examination system
10: ultrasound endoscope
12: ultrasound processor device
14: endoscope processor device
16: light source device
18: monitor
20: insertion part
22: operating part
24: universal cord
27: ultrasound connector
28: endoscope connector
30: light source connector
32: tube
34: tube
36: air and water supply button
38: suction button
42: angle knob
43: operating lever
44: treatment tool insertion port
50: distal end part
52: bending part
54: flexible part
60: ultrasound observation part
62: ultrasound transducer
64: balloon
66: locking ring
68: locking groove
70: supply and discharge port
71: opening part
72: exterior case
72a: exterior case body
72b: exterior case lid
73: partition wall
74: groove part
75: fitting hole
76: lever housing lid
77: bolt
80: endoscope observation part
86A: first inclined surface
86A1: observation window region
86A2: nozzle region
86A3: illumination window region
86B: second inclined surface
87: inclined surface
88: observation window
90A: first illumination window
90B: second illumination window
92: air and water supply nozzle
94: treatment tool delivery port
94a: elevator housing chamber
96: elevator
96a: guide surface
100: treatment tool insertion channel
102: air and water supply pipe line
104: balloon pipe line
106: suction pipe line
108: air supply pipe line
110: water supply pipe line
112: balloon water supply pipe line
114: balloon drainage pipe line
116: air supply source pipe line
118: water supply tank
120: water supply source pipe line
122: branch pipe line
124: suction pump
126: suction source pipe line
128: light guide
129: air supply pump
141: light guide distal end part
150A: observation axis
150B: observation range
151A: first illumination axis
151AX: first illumination axis
151B: first illumination range
152A: second illumination axis
152B: second illumination range
154: lumen
200: elevating case
202: base
202a: through hole
203: light guide holding groove
204: partition wall
206: side wall surface
208: facing wall surface
208a: cutout part
210: elevator elevating lever
211: bolt
212: lever housing chamber
214: holding hole
216: rotation shaft
220: bolt hole
222: operating wire
222a: distal end side coupling part
222b: proximal end side coupling part
224: wire insertion hole
226: elevator operating mechanism
226A: rotating drum
226B: crank member
226C: slider
LA: longitudinal axis
LB: reference axis
NV: normal direction
WD: width direction
Δθ: difference
θ0: observation axis angle
θ1: first illumination axis angle
θ2: second illumination axis angle

What is claimed is:

1. An endoscope comprising:
a distal end part body that is provided on a distal end side of an insertion part;
a treatment tool delivery port that is formed in the distal end part body and delivers a treatment tool inserted into the insertion part;
an elevator that is rotatably supported in the treatment tool delivery port of the distal end part body and controls a delivery direction of the treatment tool delivered from the treatment tool delivery port;
an observation window that is provided at a position closer to a proximal end of the insertion part than a rotational shaft of the elevator in a direction of a longitudinal axis of the insertion part; and
a first illumination window that is provided at a position closer to the proximal end of the insertion part than the rotational shaft in the direction of the longitudinal axis, wherein the distal end part body comprises a first inclined surface facing an observation axis which is normal to the first inclined surface and having the observation window disposed on the first inclined surface as the observation axis extends from the observation window in a normal direction, and the distal end body further comprises a second inclined surface facing a first illumination axis which is normal to the second inclined surface and having the first illumination window disposed on the second inclined surface as the first illumination axis extends from the first illumination window in a normal direction, and the distal end body further comprises a second inclined surface facing a first illumination axis which is normal to the second inclined surface and having the first illumination window disposed on the second inclined surface as the first illumination axis extends from the first illumination window in a normal direction, and the first inclined surface and the second inclined surface have different inclination angles, the first illumination window, the elevator, and the observation window are positioned in this order in a latitudinal direction perpendicular to both the direction of the longitudinal axis and a normal direction of an opening surface of the treatment tool delivery port, a first illumination axis angle is smaller than an observation axis angle from a perspective of the latitudinal direction, the first illumination axis angle is between the first illumination axis and a reference axis from a perspective of the latitudinal direction, the reference axis is parallel to the longitudinal direction, the observation axis angle is between the observation axis and the reference axis from the perspective of the latitudinal direction, and the first illumination axis and the observation axis are on opposite sides of the distal end part body in the latitudinal direction with the elevator located in between the first illumination axis and the observation axis, and the observation axis angle and the first illumination axis angle are more than 0 degree inclined relative to the reference axis.

2. The endoscope according to claim 1,
wherein both the observation axis and the first illumination axis are inclined toward a distal end side of the distal end part body from a posture perpendicular to the latitudinal direction.

3. The endoscope according to claim 1,
wherein a first illumination range of illumination light emitted from the first illumination window overlap with an observation range of the observation window.

4. The endoscope according to claim 1,
wherein the observation window and the first illumination window are provided at a position closer to a proximal end side of the distal end part body than the treatment tool delivery port in the distal end part body.

5. The endoscope according to claim 1, further comprising:
a second illumination window that is provided at a position closer to the observation window than the first illumination light in the latitudinal direction,
wherein a second illumination axis of the second illumination window is inclined toward a distal end side of the distal end part body from a posture perpendicular to the latitudinal direction, and the first illumination axis angle is smaller than a second illumination axis angle, the second illumination axis angle is between the second illumination axis and the reference axis from the perspective of the latitudinal direction.

6. The endoscope according to claim 5,
wherein the second illumination window is provided at a position closer to the proximal end side of the distal end part body than the treatment tool delivery port in the distal end part body.

7. The endoscope according to claim 5,
wherein the distal end part body has a first inclined surface on which the observation window and the second illumination window is provided.

8. The endoscope according to claim 5,
wherein a second illumination range of illumination light emitted from the second illumination window overlaps with an observation range of the observation window.

9. The endoscope according to claim 1,
wherein an elevator support casing that rotatably supports the elevator is provided at a position of the elevator on the distal end part body,
a light guide that emits illumination light through the first illumination window is inserted into the insertion part, and
the elevator support casing holds a light guide distal end part of the light guide.

10. The endoscope according to claim 1, further comprising:
an ultrasound transducer that is provided in the distal end part body and is located closer to a distal end side of the distal end part body than the treatment tool delivery port.

11. The endoscope according to claim 10, wherein, in a view which is in the latitudinal direction, along a short side of the distal end part body, the observation window, the first illumination window and the elevator are positioned in this order in the normal direction which is perpendicular to the longitudinal direction which is along a long side of the distal end body and is perpendicular to the latitudinal direction from a side on which the treatment delivery port is observable.

12. The endoscope according to claim 5, wherein the second illumination axis angle equals to the observation axis angle.

13. The endoscope according to claim 5, wherein the first illumination axis angle, the second illumination axis angle, and the observation axis angle overlap among one another.

14. The endoscope according to claim 1, wherein the first inclined surface and the second inclined surface are both flat surfaces.

15. The endoscope of claim 1, wherein the first illumination window, the elevator, and the observation window are positioned in this order in the latitudinal direction further comprising:
the first illumination window is situated on one side of the distal end body in the latitudinal direction, and the observation window is asymmetrically situated on the other side of the distal end body in the in the latitudinal direction.

16. The endoscope of claim 5, wherein the first illumination window, the elevator, and the observation window are positioned in this order in the latitudinal direction comprising:
the first illumination window, the elevator, the observation window and the second illumination window are positioned in this order in the latitudinal direction.

17. The endoscope of claim 16, wherein the second illumination window is asymmetrically situated on the same side of the distal end body as the observation window in the latitudinal direction.

18. The endoscope of claim 16, wherein the first illumination window is below the observation window when the opening surface of the treatment tool delivery port faces an upward direction.

19. The endoscope of claim 18, wherein the observation axis angle and the first illumination axis angle and the second illumination axis angle are more than 0 degree inclined relative to the reference axis when the opening surface of the treatment tool delivery port faces an upward direction.

\* \* \* \* \*